Nov. 11, 1969

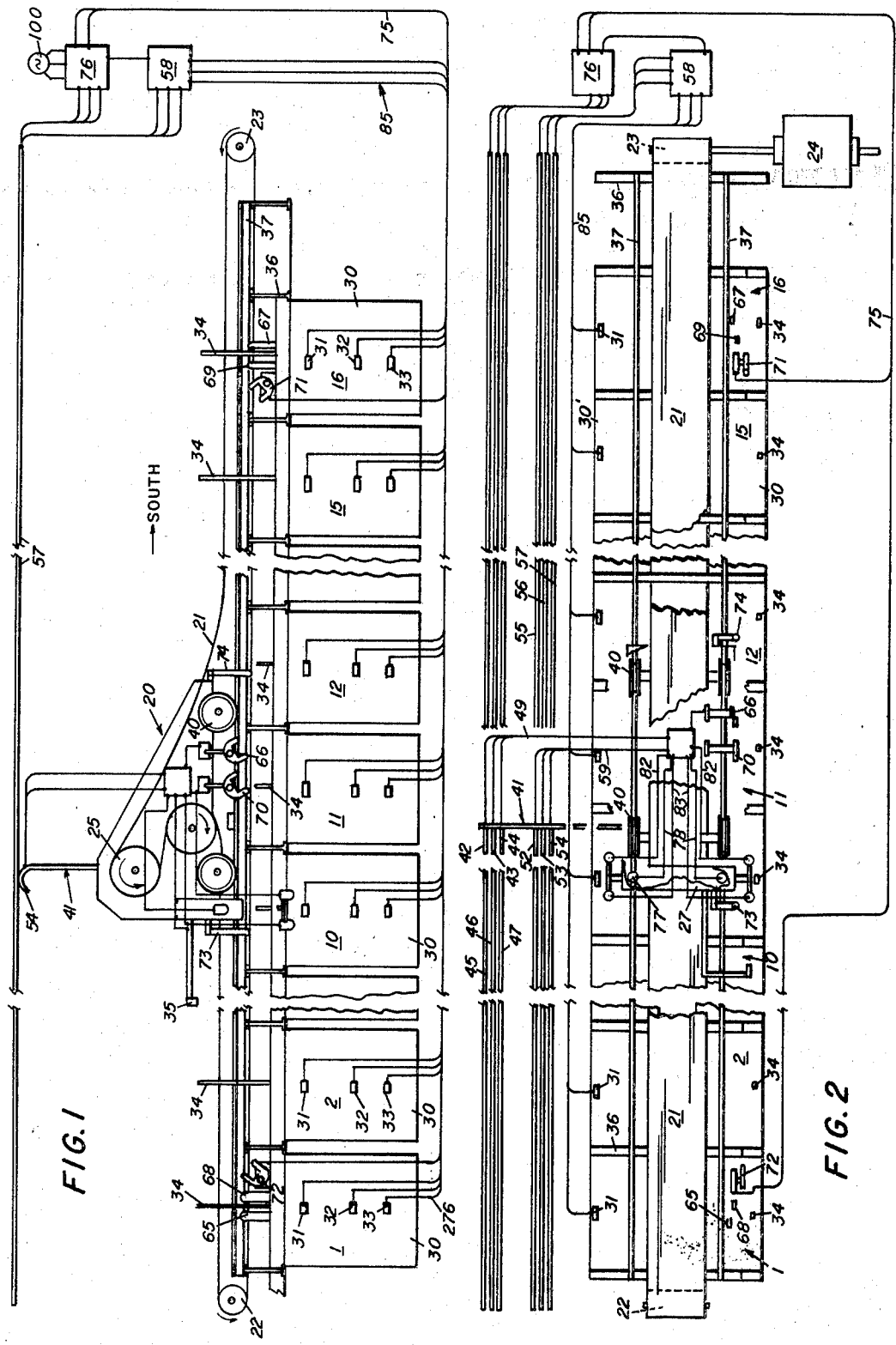

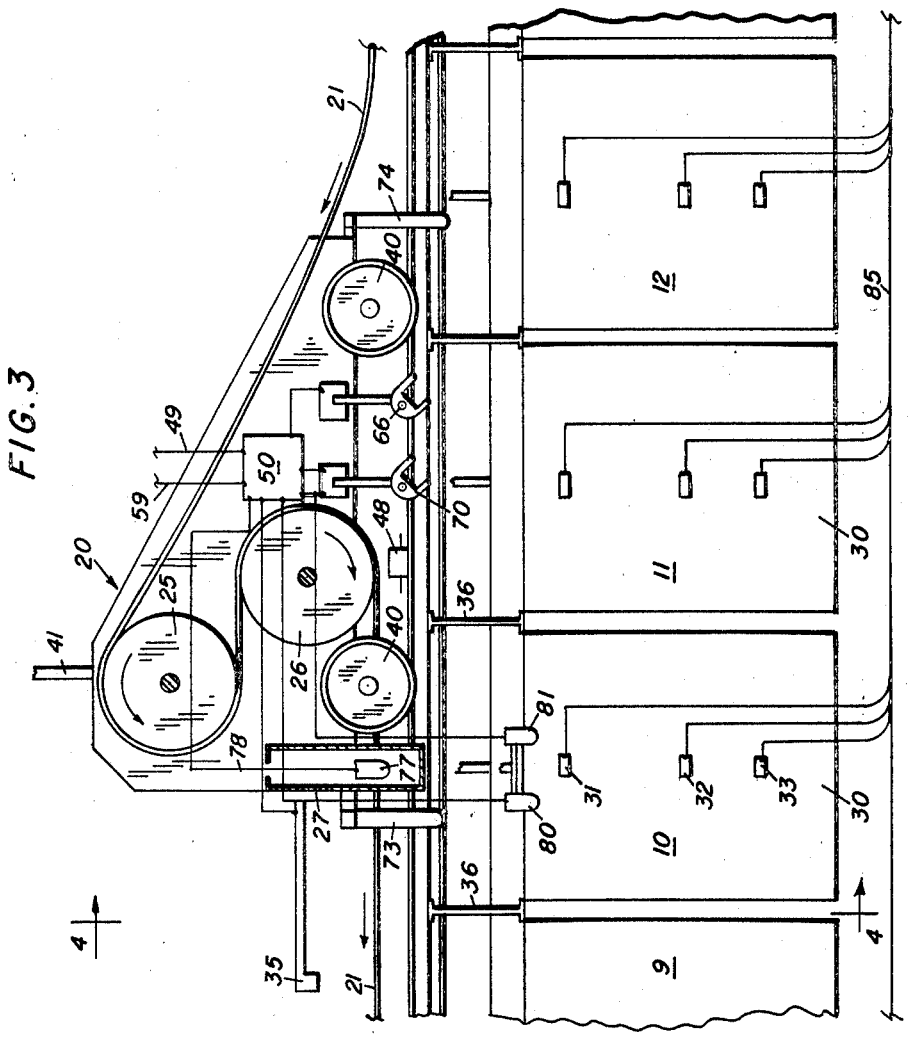
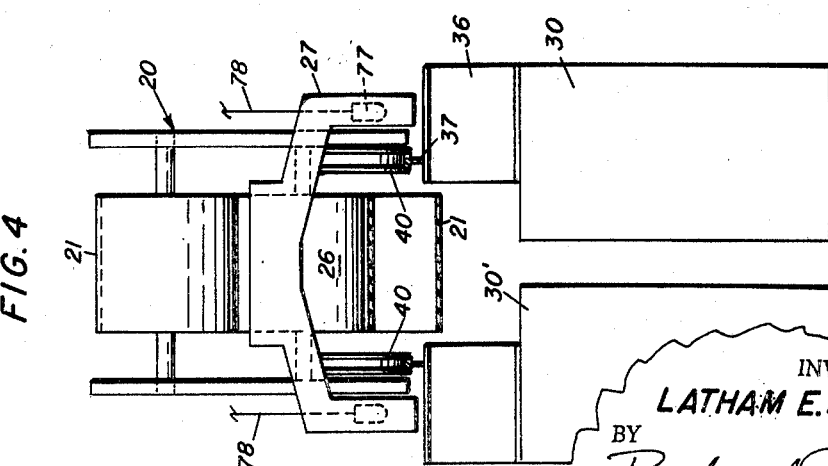

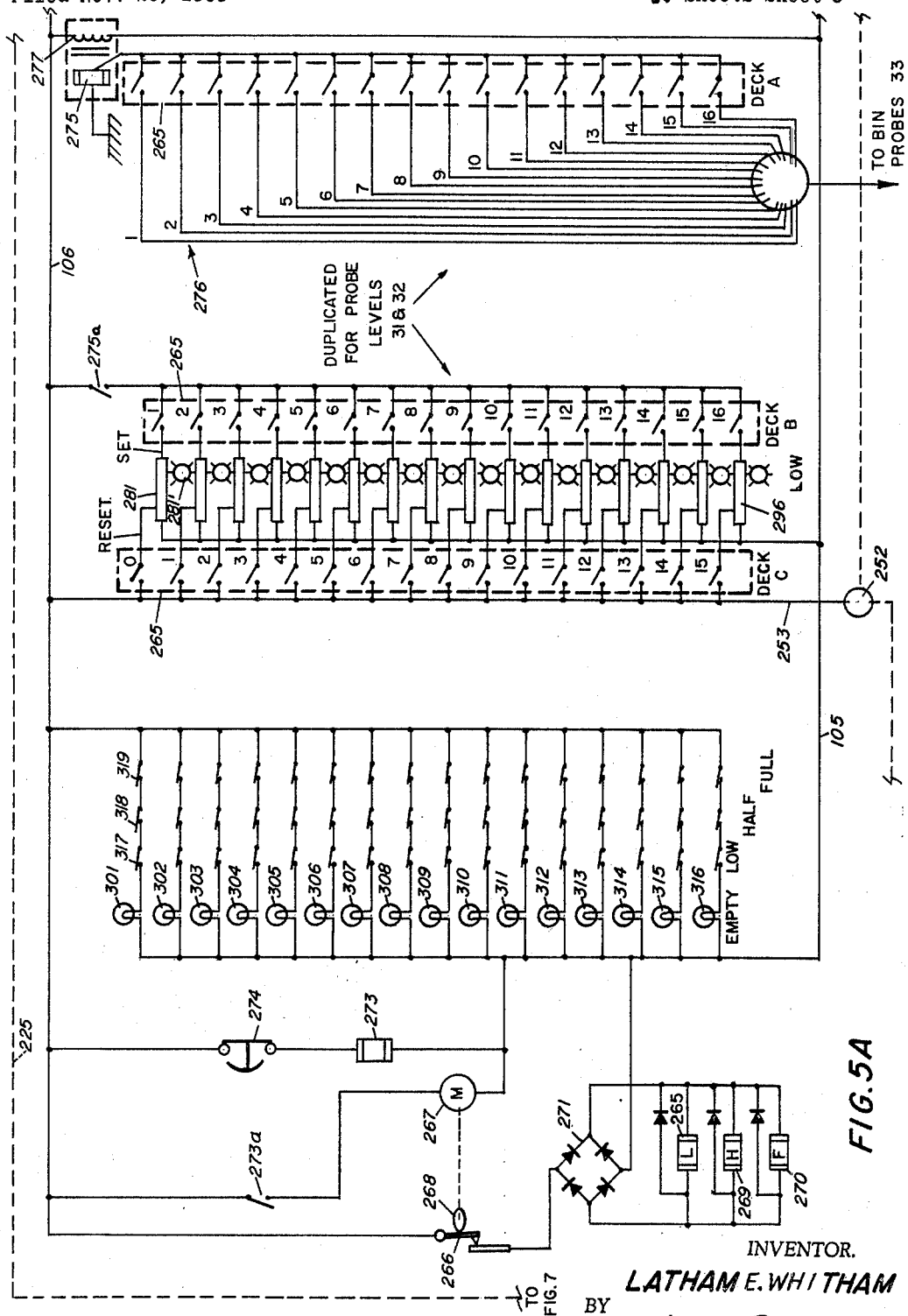

L. E. WHITHAM 3,477,593

AUTOMATIC REMOTE TRIPPER CONTROL

Filed Nov. 25, 1966

INVENTOR.
LATHAM E. WHITHAM
BY
ATTORNEYS

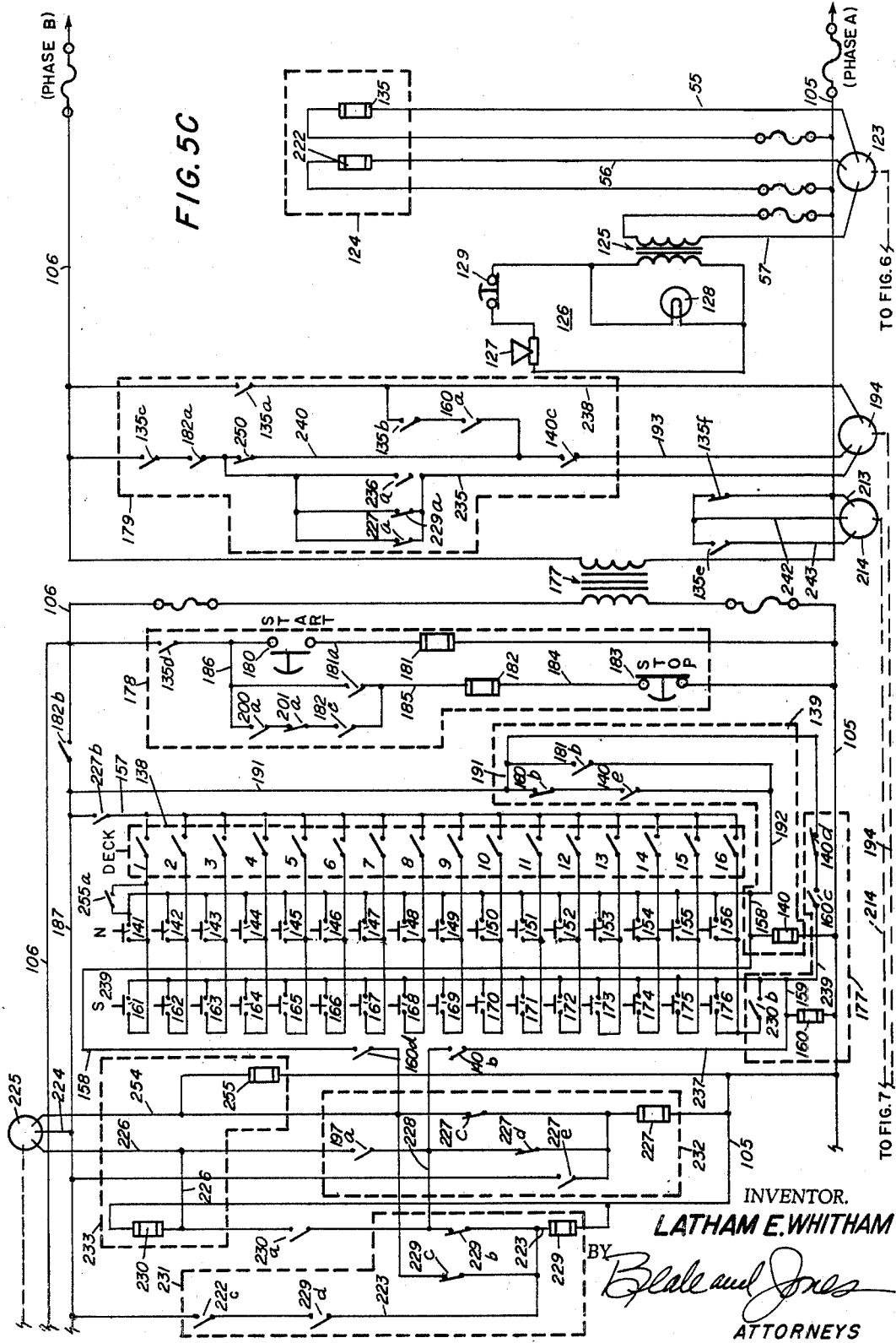

Nov. 11, 1969 L. E. WHITHAM 3,477,593
AUTOMATIC REMOTE TRIPPER CONTROL
Filed Nov. 25, 1966 10 Sheets-Sheet 6
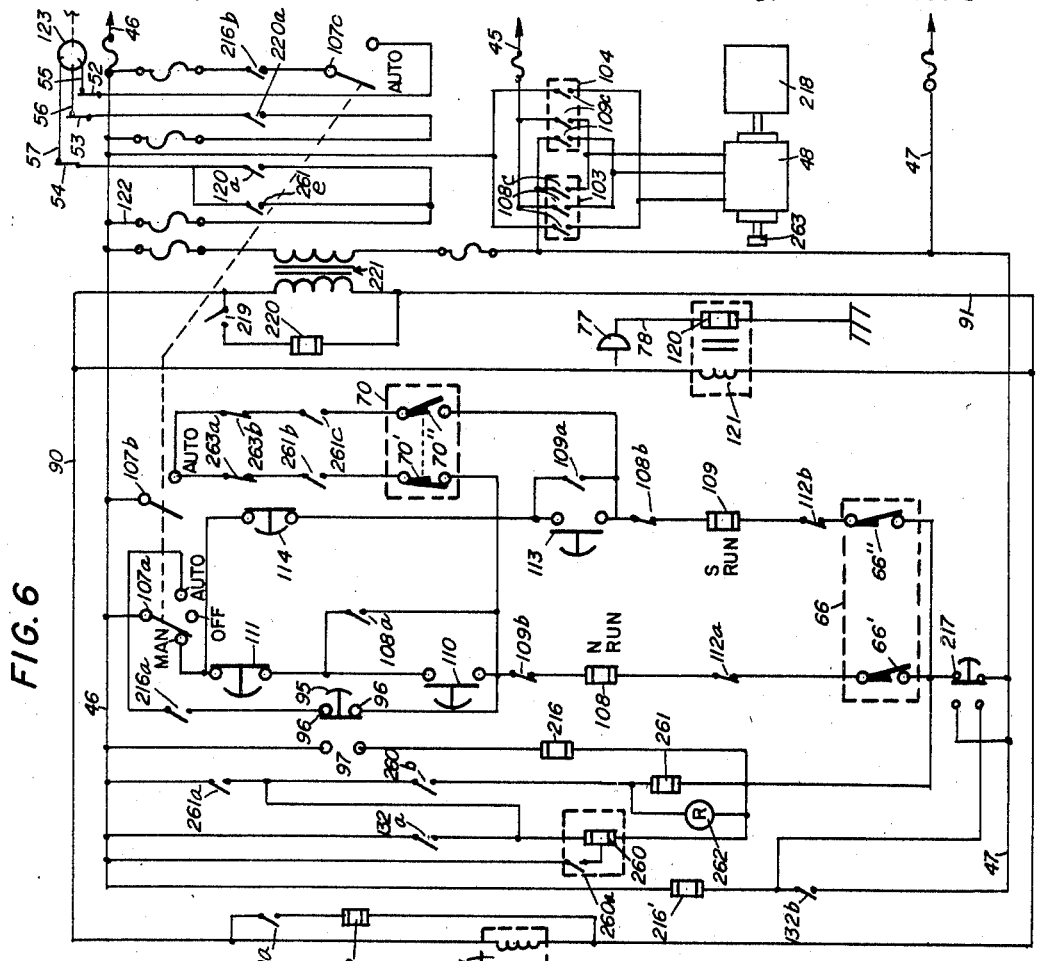
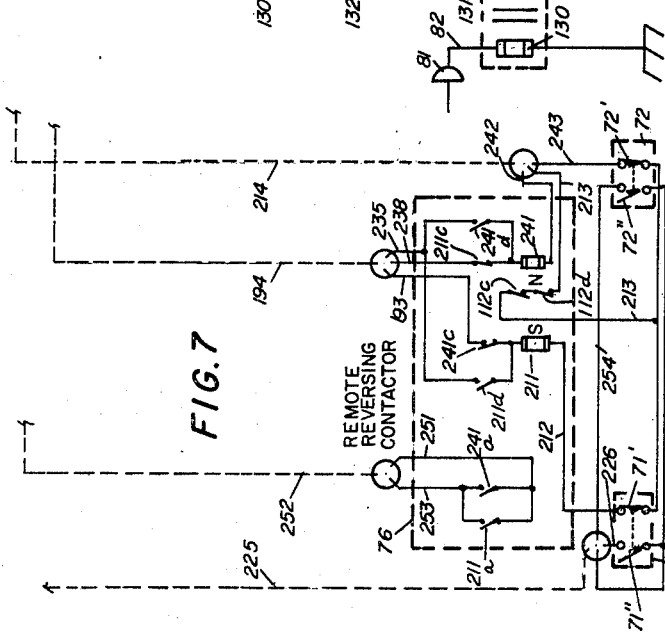
INVENTOR.
LATHAM E. WHITHAM
BY
ATTORNEYS

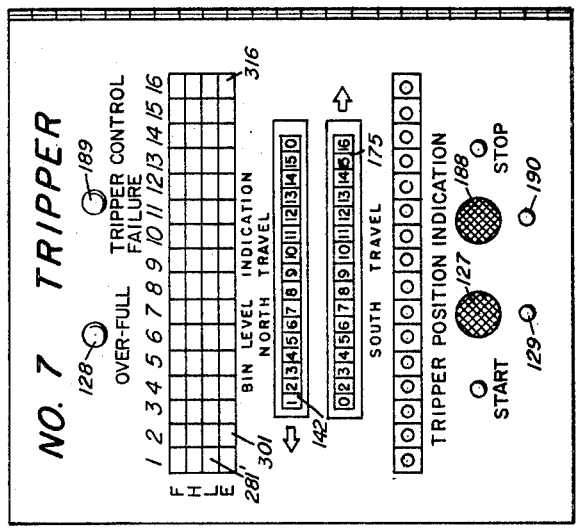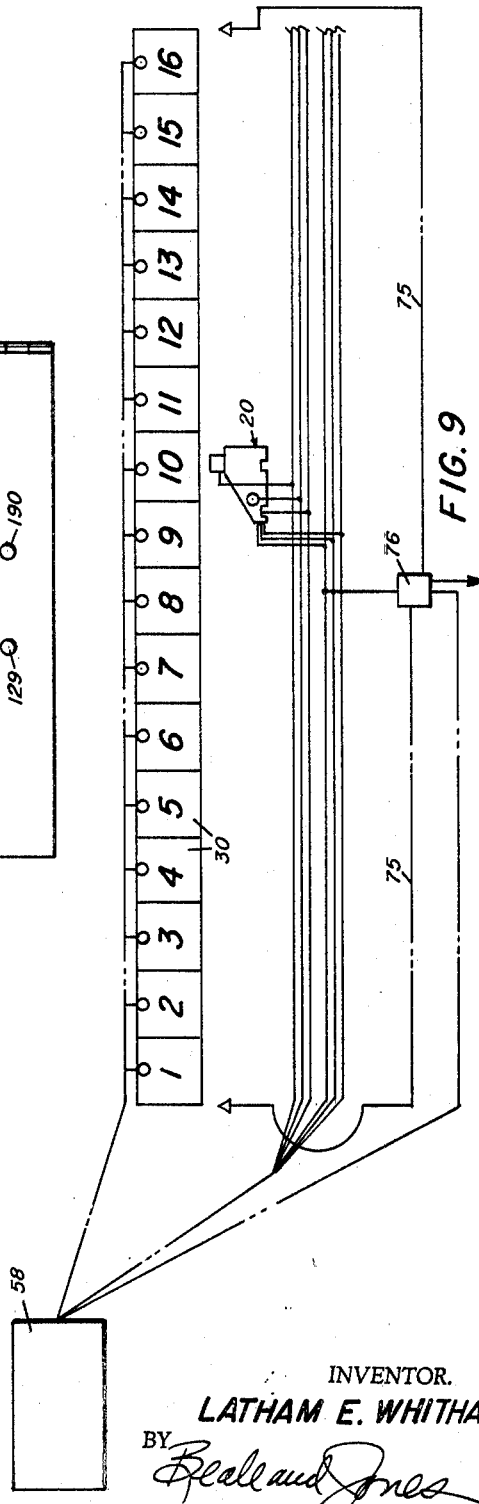

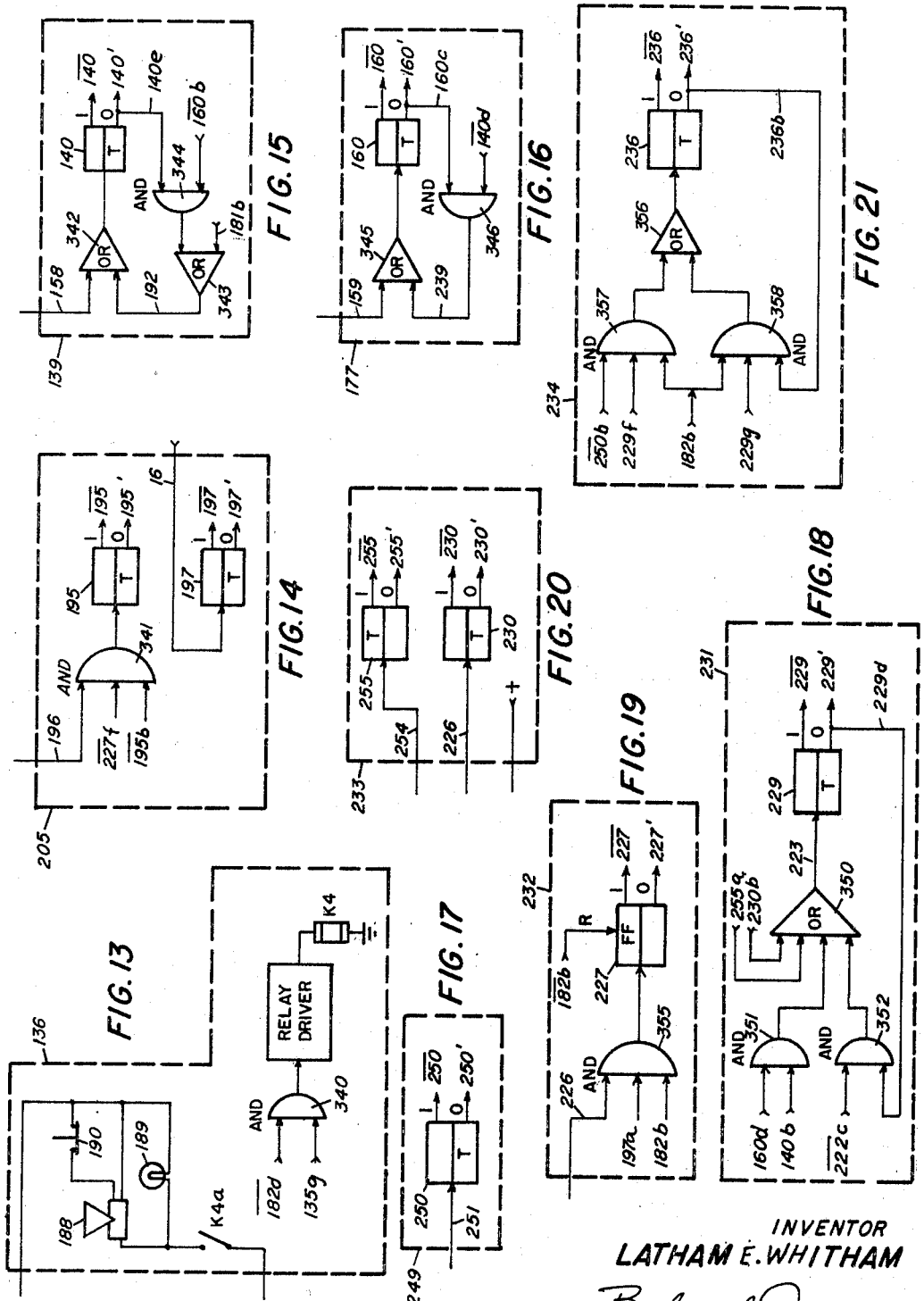

Nov. 11, 1969  L. E. WHITHAM  3,477,593
AUTOMATIC REMOTE TRIPPER CONTROL
Filed Nov. 25, 1966  10 Sheets-Sheet 10

INVENTOR
LATHAM E. WHITHAM
BY Beall and Jones
ATTORNEYS

United States Patent Office 3,477,593
Patented Nov. 11, 1969

3,477,593
AUTOMATIC REMOTE TRIPPER CONTROL
Latham E. Whitham, Hurley, N. Mex., assignor to Kennecott Copper Corporation, New York, N.Y., a corporation of New York
Filed Nov. 25, 1966, Ser. No. 596,976
Int. Cl. B65g 1/06, 15/00
U.S. Cl. 214—16
33 Claims

ABSTRACT OF THE DISCLOSURE

A control system for a tripper, providing a remotely controlled programmed mode of operation whereby the tripper unloads a conveyor into a selected group of storage locations by continuously traversing between selected points. When one of said storage locations becomes overfull, sensing means disables the remote control circuitry and energizes control circuitry on said tripper, providing autonomous control for unloading the conveyor in a second programmed mode whereby the tripper sequentially fills empty storage locations and bypasses full locations.

---

The present invention relates to a movable tripper for a conveyor belt and to a control system for providing a programmed mode of operation for the tripper. More particularly, this invention relates to a tripper for discharging a conveyor belt into an elongated storage area that is subdivided into a plurality of separate bins, the tripper being under the control of a programmer which permits the material discharged from the conveyor belt to be stored in a preselected group of said bins, the control system causing the tripper to revert to a second predetermined program upon occurrence of an emergency situation.

In the mining industry, it is quite common to accumulate ore in bins, particularly between the crushing plant and the grinding plant. Storage bins in this location function as surge storage to take up the slack between the crushing plant and the grinding plant. In addition, where a large, long storage area is available that is or that can be subdivided into a series of separate locations or bins, a continuously traveling tripper can be used to discharge into the bins successively as it travels, so as to obtain a blending of the ore. This is advantageous in making more uniform the characteristics of the material that is delivered to the grinding plant, and is a particularly desirable feature where the ore body that is being mined and crushed is not homogeneous but is characterized by the occurrence of ore in pockets that are not readily separable from gangue.

In the past, traveling trippers have been used with storage bins for carrying out both of these functions. In such conventional conveyor and tripper systems, sensing devices such as limit switches have been located at selected points along the path of travel of the tripper, the limit switches being so disposed and arranged that as the tripper passed each point, a signal was sent back to a central control panel. The purpose of such signals was twofold: first, to inform an operator at the control panel of the location of the tripper; and second, to initiate performance of such automatic functions as might have been set up at the control panel to correspond to the particular location. Such limited information had a correspondingly limited value. Moreover, systems of this kind are expensive to install initially, and in many cases, the maintenance costs involved for continuous operation were also rather high.

One object of the present invention is to provide a conveying and storage system including a conveyor belt and a traveling tripper for use with the belt, the tripper being operated to deposit ore or similar material in an elongate pile, optionally in a plurality of bins, the system including a control apparatus for operating the tripper and conveyor, wherein the initial installation and maintenance are simpler and comparatively less expensive than was the case with past, conventional systems.

Another object of the invention is to provide a conveying and storage system as described, wherein the traveling tripper can be operated automatically by means of its control system to fill a selected group of bins out of a series of bins, the tripper moving continuously to traverse successively the bins in the selected group and continuously discharging material into the bins as it travels from one end of the selected group to the other in a "blanketing" or "point traversing" operation.

A further object of the invention is to provide a system of the character described wherein the tripper can be operated by manual control whenever desired.

Still another object of the invention is to provide a tripper control system which permits automatic "spot" discharge, in which the tripper remains stationary over a particular bin until it is filled, and in which the control system will automatically move the tripper in the event that the particular bin becomes full, to position the tripper over a bin that is not full. A related object of the invention is the provision of a system as described in which the control system automatically switches to the above-described spot discharge whenever an emergency situation arises, as when one of the bins over which the tripper is traversing becomes overfull, the control system automatically activating an alarm while moving the tripper away from the overfull bin.

A more general object of the invention is the provision of a system of the character described in which the control system for the tripper can be programmed to operate in a particular desired sequence and in which the controls can be adjusted to depart from the desired program in the event that conditions require such departure, as, for example, in the case where a bin or a number of bins are overfull, but are included in the programmed sequence.

These and other objects, as well as the various novel features which are characteristic of the present invention, will be understood more clearly and fully from the following detailed description and from the recital of the appended claims, taken in conjunction with the accompanying drawings, in which:

FIG. 1 is a fragmentary, schematic, side elevation partly broken away, of a system constructed in accordance with one preferred embodiment of the present invention and showing a series of storage bins, a conveyor belt mounted above the storage bins, a traveling tripper disposed along the upper reach of the conveyor belt, and parts of the control system for the tripper;

FIG. 2 is a fragmentary top plan view thereof partly broken away;

FIG. 3 is a fragmentary side elevation thereof, partly broken away and illustrating the construction of the traveling tripper;

FIG. 4 is an end plan view taken along the line 4—4 of the traveling tripper of FIG. 3 illustrating the arrangement of the discharge chutes;

FIGS. 5A to 5C are schematic wiring diagrams showing one way in which a control console can be wired in accordance with one preferred embodiment of this invention, in order to accomplish its desired function;

FIG. 6 is a schematic wiring diagram showing one way in which the traveling tripper can be wired, in accordance with the same embodiment of this invention, for connection to the control console and other control wiring;

FIG. 7 is a schematic wiring diagram showing one way in which the remotely located reversing switches and contactors can be wired in accordance with the same embodiment of this invention;

FIG. 8 is a schematic wiring diagram of the power supply switching for the same embodiment of the invention;

FIG. 9 is a schematic wiring diagram showing the manner in which the traveling tripper is wired to cooperate with the level sensing devices in the bins and with other parts of the control system;

FIG. 10 is a plan view of the control panel of the control console;

FIG. 11 illustrates the relationship of FIGS. 5A–5C;

FIGS. 13 through 26 are schematic diagrams of logic circuit arrays which may be used in the second embodiment.

Figure 5B:
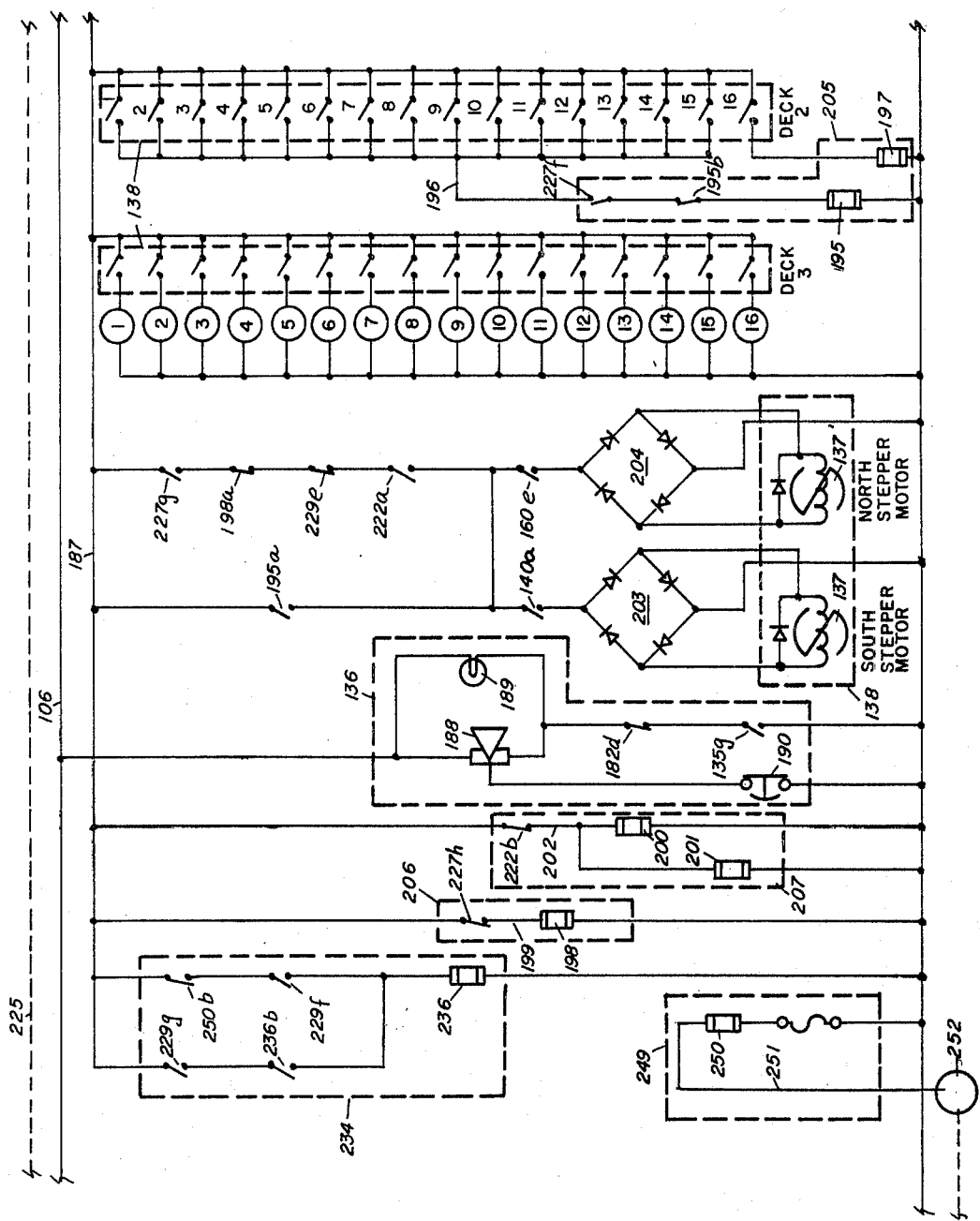

Briefly, the invention can be summarized as follows: The conveyor belt and tripper are mounted above a series of side-by-side bin locations or other suitable receiver areas. The tripper discharges material such as crushed ore from the conveyor belt into the bin location over which it is traversing or positioned. A sensing device such as a magnetic proximity switch is mounted on the tripper unit and fixed indicators are attached to each bin or station location to form indexing points. A reversing power contactor is mounted on the tripper unit for use when the tripper is operating under autonomous, or self, control. Another reversing contactor unit is mounted in a convenient fixed position for use when the tripper is operating under the control of the remote console circuitry. These contactor units serve to reverse the direction of travel of the tripper at suitable points in its control sequence. Trolley wires are provided to transmit intelligence from the central control console to the tripper unit as well as in the reverse direction. In addition to the tripper-mounted, autonomous control reversing power contactor mentioned above, the tripper also carries an emergency limit switch which becomes operative only in the event of failure in the reversing power contactor or its control circuit. The tripper-mounted autonomous control and the emergency limit switch are each operated by respective actuator bars located at each end of the proposed maximum tripper run, the emergency limit switch actuators being located a few feet beyond the position of the autonomous reversing contact actuators. The emergency limit switch will act to cut off all power from the tripper and at the same time cause an alarm to sound in the event that either the console control system or the autonomous control reversing power contactor fails to reverse the direction of the tripper. If desired, the limit switch may also be used to stop the conveyor belt, or to stop any more material from being fed onto it.

The control system described in the present embodiment of the invention is primarily arranged to provide "blanket operation," or "point traversing" of the tripper. In using these terms, reference is made to continuous back and forth movement of the tripper across a selected group of bins or across the whole series of bins, with continuous discharge of the tripper during its movement so that a blanket of ore or other material is continuously laid down from the tripper into the bin locations beneath it. Pushbutton switches are provided on the control console for designating the indexing points between which the tripper is to operate. In operation, one button in a first set of buttons is depressed to determine the extent of the tripper travel in one direction while another button in a second set of buttons is depressed to control travel in the opposite direction. With these points established and the system energized, the tripper will automatically synchronize with a stepping switch and will continue to operate between the selected index points until they are changed, until the power is removed, or until the tripper is compelled to go on self-control by an emergency situation. It will be apparent that the control system can be modified to provide for spot operation whereby selected bins are completely filled in sequence; however, the preferred embodiment of the invention provides for blanket, or point traversing, operation.

The control system for the tripper includes a sensing installation in each bin for determining the level of material within the bin. Each sensing installation may include, for example, three probes disposed respectively at different levels within their bin locations to detect whether the bin is empty, low, half-full or full, and to transmit an indication of this condition to the control panel. Means are provided at the control console for interrogating each sensing probe to provide the indicator signals.

In accordance with a preferred embodiment of the invention, the control console includes an electrically activated bi-directional stepping switch which operates in one of its directions for each direction of tripper travel. This stepping switch is disposed to cooperate with the limit switches located at the opposite ends of the tripper run or with the selected indexing points to program the operation of the tripper. The stepping switch employs two impulse-type driving motors, one of which is activated by the proximity switch located on the tripper each time it passes an indexing point. Determination of which stepping motor receives the pulse from the proximity switch is made by the state of energization of directional relays in the console. The index points designated by the pushbuttons are interconnected with the stepping switch so that when the selected point is reached, relays are activated which will switch the remote reversing contactor unit and send the tripper in the opposite direction.

A safety override is provided in the control system for the situation where the tripper is under automatic control and the bin into which it is discharging becomes overfull. In such a case, the system will sense the condition of the bin and will automatically cause the tripper to be moved to a bin that is less than full. At the same time, an alarm is activated at the control console and the tripper is released from programmed control by the console system. Under these conditions, the tripper can be described as under autonomous control. The tripper remains under self-control until the overfull bin situation is corrected or until an operator has placed the system under manual control.

Turning now to a more detailed description of the tripper and conveyor system of the present invention, reference is now made to FIGS. 1, 2, 3, 4 and 10, wherein there is illustrated generally at 20 a tripper arranged in accordance with the present invention. The tripper is designed to move along the upper run of a conveyor belt 21 which stretches between a head conveyor pulley 22 and a tail conveyor pulley 23. The upper run of the endless conveyor belt, which may be driven by a conveyor drive motor 24, passes through tripper 20, over first snub pulley 25 and around second, or lower, snub pulley 26, the material carried by the conveyor belt being discharged therefrom as the belt passes over snub pulley 25. The material so discharged falls into tripper ore chute 27 and is directed thereby into ore bins 30 and 30' located on either side of the path of travel of the tripper. As may be seen in FIGS. 1 and 2, and as further illustrated in FIG. 10, ore bins 30 and 30' are arranged in a series along the path of travel of the conveyor belt and the associated tripper 20. Bins 30 and 30' may be separate ore storage locations on opposite sides of the tripper, or may be considered as being a single bin having two intake areas. For purposes of this disclosure, bins 30 and 30' are considered to be a single storage location and thus will be considered to be a single bin. For purposes of illustration, the present embodiment is shown as having sixteen bins or storage areas and the control circuitry described herein is predicated on this number of bins. However, it will be apparent to those skilled in the art that any desired number of storage areas may be used with the general principles described herein.

In this embodiment, each bin is provided with a series of three indicator probes, a top probe 31 for indicating when the bin is full, a middle probe 32 for indicating when the level of material in the bin is at or above approximately the half-way mark, and a lower probe 33 which indicates whether there is a minimal amount of ore in the bin. Each bin has this series of three probes, the probes for bin 1 being hereinafter referred to as probes 31–1, 32–1 and 33–1, respectively, the probes in bin number 2 being referred to as 31–2, 32–2 and 33–2, and so on. A similar means of indicating various elements which are duplicated on the several bins will be used hereinafter, the first number referring to the element and the second number referring to the bin in which that element is located. Each bin is provided with an indexing bar 34 which cooperates with an indexing probe 35 carried by the tripper to provide a proximity switch which will produce pulses during travel of the tripper to provide an indication of the location of the tripper with respect to the series of bins. The proximity switch employed may be of the photosensitive type, capacitance type, magnetic type or any other type producing an electrical pulse when a properly defined index point is encountered. In this instance a magnetic type switch is illustrated, the switch consisting of an electromagnet and relay carried by probe 35 and a piece of ferromagnetic material mounted on each of the indexing bars 34, whereby an electrical pulse is produced in the relay circuit as each indexing bar is passed.

Mounted on a trellis formed by girders 36 extending over the bin areas are tracks 37 extending the length of the bin area. These tracks are arranged to carry the tripper as it moves along the path of the conveyor over the various bin locations. The girders 36 also support the rollers required for guiding the conveyor belt, but these, being conventional, have not been shown. Tripper 20 is provided with wheels 40 adapted to engage rails 37 to carry the tripper in its path of movement.

Mounted on the tripper and extending to oneside thereof is a trolley support 41, carrying at its outer end three power collectors 42, 43 and 44. These power collectors cooperate with the three power conductors 45, 46 and 47, respectively, to transmit power from an external source of three-phase or direct current power to the tripper to energize its drive motor 48, the power being supplied by way of suitable reversing contacts to be described below. Although the present device is illustrated as being powered by three-phase current, it will be apparent that a direct current power source may be used with appropriate modification of the system. Power conductors 45, 46 and 47 are positioned adjacent the path of travel of tripper 20 whereby contacts 42, 43 and 44 will pick up current for transmission through conduit 49 to tripper junction box 50. In a similar manner, the trolley 41 carries control collectors 52, 53 and 54 which cooperate with control conductors 55, 56 and 57, respectively, to transfer various control signals between a central control console 58 and the control circuitry on the tripper. These signals are transmitted by way of conduit 59 to the junction box 50 on the tripper. Conductor 55 carries the power control signals from the console, while conductor 57 carries the console alarm circuit signals as will be more fully set forth hereinbelow.

Located at each end of the path of travel of tripper 20 are various switches and switch actuators which cooperate with corresponding elements on the stripper itself to provide limit control of the operation of the tripper. If it is assumed that movement of the tripper to the right, as viewed in FIG. 1, is travel in a southerly direction and movement to the left is travel in a northerly direction, then the various switches and actuators can be identified as north or south limit switches. Accordingly, there is located at the lefthand limit of travel of tripper 20 a north travel limit actuator 65 which cooperates with an emergency travel limit switch, illustrated diagrammatically at 66 and carried by tripper 20. Similarly, there is provided at the opposite end of the series of bins, at the right-hand limit of tripper movement, a south travel limit actuator 67 which also cooperates with the travel limit switch 66. North-south travel limit switch 66 is operated by the two actuators 65 and 67 and serves to disconnect power from the tripper drive motor in the event that the tripper moves beyond its predetermined limits along track 37. At either end of the path of travel of the tripper, so located as to become operative before limit switch 66 is operated, are north and south reversing limit actuators 68 and 69, respectively, arranged to actuate the reversing limit switch 70 on the tripper. Actuators 68 and 69 are so placed with respect to the travel of the tripper that they become operative only when the tripper is operating under autonomous, or self, control, actuators 68 and 69 serving to reverse switch 70 at each end of the tripper run automatically and before the travel limit switch 66 is operated. It is this switch which causes the tripper to traverse between opposite ends of its run when the control console has been disabled and the tripper is under self-control.

At each end of the tripper run, near the location of the emergency travel limit and the north and south autonomous reversing limit actuators, are south and north remote reversing limit switches 71 and 72, respectively, which are actuated by north and south remote limit switch actuators 73 and 74, mounted on the north and south ends of tripper 20. Switches 71 and 72 are connected through conduit 75 to the remote master reversing contactor 76 for use in conjunction with the automatic control circuitry, as will be described below.

To provide alarm signals in the event of an emergency condition, tripper 20 carries a choke-up sensing probe 77 located in each arm of chute 27 to provide a signal upon occurrence of a stoppage in the chute. This alarm signal may be connected through lines 78 to the tripper junction box 50 and thence through the control conductors to the central console, where an audible alarm may be sounded and movement of the conveyor belt stopped until the blockage is removed. A pair of bin sensing probes 80 and 81 are carried by the tripper to sense overfull conditons in any of the bins over which the tripper is passing. If an overful condition is sensed in a bin, a signal is applied through lines 82 and 83 to the tripper junction box 50. These signals are transmitted to the central control console where, again, an alarm is sounded and the programmed control sequence which required material to be discharged into the overfull bin is disabled and another program takes over, as will be explained below. It should be noted that bin indicator probes 31, 32 and 33 are connected through a conduit 85 to the central control console 58.

Considering now, the control circuitry in the system in both its manual and automatic modes of operation, reference is made to FIGS. 5A, 5B and 5C which comprise the schematic diagram of the central control console, to FIG. 6, which is a schematic diagram of the circuitry carried by tripper 20, to FIG. 7, which illustrates the circuitry of the remote reversing contactor 76 and the south and north remote reversing limit switches 71 and 72, and to FIG. 8, which illustrates the power supply for the system. The control circuitry in these figures is comprised of numerous relay coils and associated contacts, all of which are illustrated in their rest, or deenergized, condition. The various relay coils, when energized, shift their corresponding contacts to the position opposite that shown in the drawings. Those contacts which correspond to the various relay coils carry the same number as their operating coils plus an alphabetical designation. FIG. 5A is primarily illustrative of the bin level sensing circuitry, FIG. 5B illustrates the control stepper switch being used the synchronize the operation of the control circuitry with the position of the tripper, while FIG. 5C illustrates the tripper run selector mechanism which operates in conjunction with the stepper switch to determine the limits of the tripper motion.

As illustrated in FIG. 8 the system preferably is energized by a source of three-phase electrical current 100 supplying phases A, B and C through master switch 101 and through phase reversing contactors 102 to the power conductors 45, 46 and 47. Reversing contactors 102 serve to reverse phases A and C which supply the drive motor in tripper 20, and thus to reverse drive motor 48, when so programmed by the control console. As may be seen in FIGS. 2 and 6 the three-phase current appearing on lines 45, 46 and 47, is collected by collector contacts 42, 43 and 44, respectively, which are mounted on the tripper, collectors 42 and 44 applying the reversible phases A and C to motor 48 through continued power conductors 45 and 47 and three-phase motor switch contacts, or contactors 103 or 104, and collector 43 applying phase B to the tripper through continued conductor 46. Motor contacts 103 and 104 may also be used to reverse motor 48, these switches being used when the tripper is under manual control or under autonomous control, while phase reversing switch 102 is used when the tripper is under automatic control. Phases A and B from alternating current source 100 are also applied to the control console through lines 105 and 106.

When in the manual mode of operation, one of the two sets of contacts in phase reversing switch 102 is normally closed (manually), as explained below, to apply phases C, B and A, for example, to the power conductors 45, 46 and 47, respectively. Mode selector switch 107 (FIG. 6) is switched to "manual" to apply power through appropriate start and stop switches to either the north run or the south run relay coils 108 or 109, respectively. It should be noted that mode selector switch 107 includes contacts *a*, *b* and *c* mechanically connected to effect the required circuit changes for manual and automatic operation. Under manual control, the tripper moves in either a north or a south direction under direct pushbutton control of an operator, with the only automatic feature being an automatic shut-down if the tripper travels too far along its track. If the tripper is to run in a northerly direction, the north run start button 110 is depressed, permitting current to flow from line 46, through selector switch contact 107*a*, through normally closed north stop button 111, normally open north start button 110, normally closed south interlock switch 109*b*, north run relay coil 108, normally closed overload 112*a*, through normally closed north emergency limit switch contact 66' and through normally closed safety lockout switch 217 to line 47. This energization of relay coil 108 closes contact 108*a* to provide a self-holding circuit for coil 108 to keep the tripper on its northerly course until north stop button 111 is depressed. Coil 108 also opens contact 108*b* in circuit with south run relay coil 109 to prevent energization of coil 109 before deenergization of coil 108. Coil 108 further operates to close contacts 108*c* of motor switch 103, thus connecting motor 48 to the source of alternating current power across lines 45 and 47 to drive the tripper in a northerly direction.

To reverse the direction of the tripper, stop button 111 must be depressed to deenergize north run relay coil 108, thus releasing contacts 108*a*, 108*b* and 108*c*, and stopping drive motor 48. South run start switch 113 may then be depressed to energize coil 109. Energization of 109, by way of contactor 107*a*, south run stop button 114, north interlock 108*b*, overload contact 112*b*, emergency limit switch contact 66" and safety lockout switch 217, closes self-holding contact 109*a*, opens 109*b* and closes contacts 109*c* of motor switch 104, thus reversing the phase of the current applied to motor 48 and driving the tripper in the opposite direction. The south-travelling tripper may be stopped by depression of south run stop switch 114. Overload contact switches 112*a* and 112*b* serve to stop the operation of the tripper in the event of an overload condition, while emergency limit switch contacts 66' and 66" open the respective north and south run relay coil circuits in the event that the tripper engages either the north or the south travel limit actuators 65 and 67, respectively. When either of these emergency switch contacts is opened, the tripper comes to a stop and will remain stopped until it is manually reversed. If desired, switch contacts 66' and 66" may also be used to stop the conveyor belt, to stop the delivery of material to the conveyor, or both.

When under manual control, the tripper may utilize the ore chute choke-up sensing device and bin overfull sensing device, both of which may operate to sound an alarm at the central control console in the event of a stoppage in the ore chute or the occurrence of an overfull condition in one of the respective bins. The choke-up alarm utilizes a probe 77 located in the ore chute. This probe may be any one of the many known level sensing devices, the one shown herein being typical. Probe 77 is in circuit with a relay coil 120 which is inductively coupled across supply lines 90 and 91 by means of a transformer primary winding 121. When power is applied across lines 90 and 91 through the secondary winding of transformer 221, relay coil 120 is energized, but no current will flow through it until an ore stoppage occurs in the ore chute, for the sensing circuit of probe 77 is incomplete until that time. When a stoppage occurs in the area of probe 77, an electrical path is completed from a ground point through coil 120, through probe 77, and through the ore to the frame of the tripper. This permits current to flow through relay coil 120, causing relay contact 120*a* to close. Closure of this contact completes a circuit from line 46 (phase B) through line 122 and contact 120*a* to the console alarm circuit collector 54, thence to the corresponding control trolley conductor 57, which is carried to the control console (FIG. 5C) by conduit 123, through the primary of transformer 125 to power supply line 105 (phase A) to energize alarm circuit 126. The alarm circuit may be comprised of a horn 127 and a red warning light 128 connected in parallel across the secondary of transformer 125. An alarm silence button 129 may be provided in series with horn 127 to permit the sound to be turned off while the choke-up condition is being corrected. As will be noted in FIG. 10, the horn, warning light and silence button may be located on the front panel of the control console.

To sense bin overfull conditions, probe 81, which again may be any one of the many known level sensing devices, is connected through a relay coil 130 (FIG. 6) to ground, and the probe circuit is energized by means of a primary winding 131 connected across power supply lines 90 and 91. With the level sensor herein illustrated, as with the choke-up probe 77, a circuit is completed through relay coil 130 when probe 81 comes in contact with the ore in one of the bins, thus permitting current to flow through relay coil 130 to close contact 130*a*. Closure of contact 130*a* energizes slow pick-up relay coil 132 which is in series with contact 130*a* across power supply lines 90 and 91. After a preset delay time, coil 130*a* energizes program timer relay 260 by closing contact 132*a*, relay 260 in turn, closing its corresponding contact 260*b* to permit energization of bin overfull relay 261. Energization of relay 261 closes contact 261*e* to complete a circuit between power supply conductor 46 and conductor 105 (FIG. 5C) to energize alarm circuit 126, as described above. At the same time, coil 132 closes contact 132*b* to energize unlatching relay 216', thus opening contact 216*b* and removing power from the control console. It should be noted that these sensing circuits are operable in the manner here described to activate the alarm system whether the tripper is on automatic or manual control, as long as power is being supplied to the control console. Since the overfull bin sensing probe is primarily for use with automatic control, it operates the alarm through intermediate relays; however, this sensing probe can be modified, if desired, so that relay coil 130 operates relay contact 261e directly rather than through a repeater relay.

To transfer the tripper from manual control to automatic control, mode selector switch 107 is manually shifted to the "automatic" position indicated in FIG. 6, transferring contacts 107a, 107b and 107c. The power-on button 95 is then depressed, opening contacts 96 and closing contacts 97 to complete a circuit from power supply line 46 to power supply line 47 through power control relay coil 216 and safety lockout switch 217. This energizes coil 216, which is the latching coil of a two-part mechanically latching and unlatching relay, to close contact 216a in circuit with the power on button 95 and to close contact 216b in circuit with mode selector switch contact 107c. Contacts 216a and 216b remain closed after the release of power on button 95 and the resultant deenergization of coil 216, these contacts opening only upon energization of the unlatching coil 216', which is in circuit with normally open contact 132b. The closure of contacts 216b and 107c completes a circuit from line 46 (phase B) through tripper console power control relay collector 52 and its corresponding control trolley conductor 55, through conduit 123 to the master relay and proximity switch repeater relay section 124 of the control console (FIG. 5C) and thence through power relay coil 135 to power line 105 (phase A). This energizes power relay coil 135 and operates its corresponding relay contacts 135a through 135g in the control console, contacts 135a through 135f being found in FIG. 5C and contact 135g being found in the tripper control failure alarm circuit 136 in FIG. 5B. The opening of normally-closed contact 135a temporarily removes power from remote reversing contactor 76 and thus deenergizes phases A and C of the tripper power supply by opening both sets of contacts in switch 102 (FIG. 8). Power is applied to the console control circuitry and the system is ready to be operated automatically. It should be noted that under automatic control both sets of switch contacts in the phase reversal switch 102 remain open until the control circuitry commands the direction in which the tripper is to move, and thus establishes the direction in which the motor 48 is to rotate. At that time, one or the other of the sets of contacts in phase reversal switch 102 will be closed to apply appropriately phased power to the tripper drive motor.

After power has been applied to the control circuitry, the conveyor belt is started and a selection is made of the points between which the tripper is to travel during its operation. This manual selection of bin location is made by pressing the appropriate pushbuttons in the arrays for selecting north and south travel limits. Pushbuttons 141 through 156 are used to select the northernmost limit of travel for the tripper, while pushbutton switches 161 through 176 are used to select the southernmost extent of the desired tripper run. These pushbutton switches are identified on the console control panel in FIG. 10 by their respective bin numbers, pushbutton switches 141 and 161 corresponding to bin number 1 and switch numbers 156 and 176 corresponding to bin number 16. The north travel selector switches and the south travel selector switches for each bin are connected in parallel with each other across the control circuit, and each selector switch is connected in series with the stepping switch contact corresponding to the particular bin and particular direction. Stepping switch 138, which is driven by the oppositely turning stepper motors 137 and 137', preferably includes a plurality of decks, each deck having 16 contacts corresponding, respectively, to the 16 bin locations of this embodiment. Thus, selector switches 141 and 161, both corresponding to bin 1, are connected in parallel with each other and both are in series with contact 1 on deck 1 of the stepper switch 138. Similarly, north and south travel selector switches 142 and 162 are connected in parallel and the combination in series with contact 2 on deck 1 of stepper switch 138. Contacts 1 through 16 of deck 1 are connected in parallel to line 157 while the output sides of the north travel selector switches 141 through 156 are connected in parallel through line 158 to a south direction relay coil 140 located in a south direction relay control circuit 139. Similarly, south travel selector switches 161 through 176 are connected through output line 159 to north direction relay coil 160 located in a north direction relay control circuit 177. Coils 140 and 160 serve to reverse the direction of travel of the tripper when it reaches the limit prescribed by the respective north and south selector switches. Thus, when the tripper has reached the northernmost limit established by pushbutton 141–156, relay coil 140 is energized to reverse its direction. When the tripper has reached its southernmost point, as determined by the south travel sector switches 161–176, relay coil 160 is energized to again reverse the direction of travel.

If, for example, the northernmost limit of travel of tripper 20 is to be bin number 2, pushbutton switch 142 will be depressed at the control panel of FIG. 10. Similarly, if the southernmost limit of travel is to be bin number 15, pushbutton switch number 175 will be depressed at the control panel. Closure of these two switches permits energization of relay coils 140 and 160 upon closure of the corresponding contacts on stepper switch 138, as will be described more fully below. It should be noted that each pushbutton switch is provided with a series lamp to provide a visual indication at the control panel of which positions have been selected.

After having selected the limits of travel for the tripper, the remote starter button 180 in the console power supply circuit 178 (FIG. 5C) is depressed to energize the start control relay coil 181 and to close its corresponding contacts 181a and b. Closure of switch 180 places coil 181 across power supply lines 105 and 106, relay contact 135d having been closed by energization of coil 135 when the tripper was switched to automatic. It will be noted that the control circuitry is energized through transformer 177 to provide the appropriate voltage level. Closure of contact 181a energizes the remote power-off relay coil 182 by connecting it across lines 105 and 106 through remote manual stop switch 183, which is normally closed, line 184, line 185, contact 181a, line 186 and contact 135d. Energization of coil 182 shifts contacts 182a–d, applying control power to the system. Contact 182a, located in the remote contactor power supply circuit 179, closes so that power from line 106 can be fed to the remote reversing contactor 76. Contact 182b closes to provide control circuit power to line 187, contact 182c is part of a holding circuit for relay coil 182 and contact 182d is connected in the alarm circuit 136 (FIG. 5B). Alarm circuit 136, which is designed to provide a warning of failure in the control circuitry, is comprised of the parallel arrangement of horn 188 and red warning light 189, the parallel combination being connected across lines 105 and 106 through switch contacts 135g and 182d. These two contacts are shifted during normal operation of the system, contact 135g then being closed and contact 182d then being opened. Any failure of the control power, without an accompanying failure of the system power which energizes relay coil 135, will release relay coil 182 and permit contact 182d to return to its normal closed position, thus energizing the alarm circuit 136 to warn the operator of the system that the control power has failed. A normally closed alarm silence switch 190 permits the sound horn 188 to be turned off while the operator is searching for the fault in the control circuitry. It will be apparent that if the main power supply fails, contact 135g will open and alarm 136 will be inoperative.

Closure of contact 182b upon energization of relay coil 182, as above described, energizes several control networks as follows. Control power is applied from line 187 through line 191 to the south direction relay control circuit 139, and thus through shifted contact 181b, line 192, and line 158, through south direction relay coil 140 to power line 105, thus energizing coil 140 and shifting its corresponding relay contacts 140a–e. Contact 140a is in circuit with the south stepper motor 137 to permit energization thereof; contact 140b is in circuit with the north direction relay 160 to act as an interlock; contact 140c in the remote contactor power circuit 179 closes to provide power to line 193, which passes through conduit 194 to the remote reversing contactor 76 of FIG. 7; contact 140d in the north direction relay control circuit 177 opens to provide a further interlock for north direction coil 160; and contact 140e closes to provide a holding circuit for relay coil 140 through lines 191 and 192.

Closure of contact 182b also provides control current to decks 2 and 3 of stepper switch 138 (FIG. 5B). Contacts 1 through 15 of deck 2 are connected in parallel to line 187, the parallel arrangement being connected in series with a slow release and slow pickup relay coil 195 in a stepper synchronizing circuit 205 by way of line 196, and thence to power supply line 105, whereby coil 195 is energized upon closure of any one of the deck 2 stepping contacts 1 through 15. Contact 16 on deck 2 is connected in series with a relay coil 197 in circuit 205 between power lines 105 and 187 so that closure of contact 16 by the stepper switch energizes coil 197. Energization of relay coil 195 causes contact 195a, located in circuit with stepper switch 138, to close, its closure after energization of coil 140 serving to energize the south stepper motor 137 to advance stepper switch 138 one step. Relay contact 195b is connected in series with coil 195 whereby, upon energization of coil 195, the power from line 196 is removed therefrom. However, the slow-release coil 195 remains energized for approximately one-half second after removal of the power to insure that contact 195a remains closed a sufficient length of time to permit the stepper to advance one step. Advancement of the stepper reapplies power to coil 195, repeating the stepping process until stepper switch contact 16 is closed. Closure of stepper contact 16 on deck 2 energizes relay coil 197 instead of relay coil 195, and shifts relay contact 197a (FIG. 5C) preparatory to synchronizing stepper 138 with the location of the tripper.

The stepper switch contacts on deck 3 of stepper switch 138 are connected in parallel between line 187 and line 105. Connected in series with each contact on this deck of switch 138 is an indicator light; each light is located on the control panel of FIG. 10. When the stepper switch has been synchronized with the position of the tripper, these lights provide an indication of the tripper position, for under this condition each contact will be closed in turn as the tripper passes by the corresponding indexing bars of the bin locations.

Energization of relay coil 182 in the console power supply circuit 178 to close contact 182b further serves to energize timing relay coil 198 in the stepper switch synchronization timing circuit 206 (FIG. 5B) by way of lines 187 and 199. Energization of coil 198 shifts its corresponding contact 198a in the stepper motor energization circuit. Approximately twenty-five second slow release relay coil 200 and ten second slow pick-up relay coil 201 in the control console power interlock circuit 207 are also energized by way of lines 187 and 202 to provide an interlock with the power-off relay coil 182 to protect against mechanical malfunction at the tripper. The long delay periods in the operation of these relays serve to permit normal functioning of the control circuitry, but the relays will shut down the system in the event that too long a delay occurs in the operation of the system.

Relay coil 200 closes its corresponding contact 200a in the console power supply circuit 178 to complete the holding circuit for coil 182 while contact 201a, corresponding to relay coil 201, will open the holding circuit for coil 182 after a predetermined period of time. These delay periods are sufficiently long that the normal periodic deenergization of coil 201 will prevent the opening of contact 201a while the normal periodic deenergization of coil 200 will not open contact 200a. Thus, brief power shutdowns, as during the tripper reversing process, will not trigger these contacts.

At this point, the circuit is so energized as to cause both the stepping switch and the tripper to move toward their southernmost limits of travel, i.e., toward bin number 16, for the purpose of synchronizing the console control circuit with the position of the tripper, and the remote start button 180 can be released. If, for example, it is assumed that the stepper switch 138 is initially at such a position as to have closed the contacts on decks 1, 2 and 3 which correspond to bin number 5, while the tripper is, for example, initially located at bin number 8, it will be apparent that accurate control cannot be obtained, and that a false indication of tripper location will be given on the control panel. With stepper contact 5 closed, indicator light number 5 on the control console panel will be lit and current will be flowing from line 187 through contact 5 of deck 2, through line 196 to energize coil 195 in the stepper synchronizing circuit 205. This energization of coil 195 causes coil 195a to close and contact 195b to open, deenergizing coil 195. As noted above, contact 195 will remain closed for about one-half a second, at which time it reopens and contact 195b recloses. During the closure period of contact 195a, a pulse of current is applied through diode bridge 203 to south stepper motor 137, causing the contacts on decks 1, 2 and 3 of stepper 138 to shift one step south, i.e., toward bin 16. This opens the contacts corresponding to bin number 5. Immediately upon closure of the number 6 contacts, relay coil 195 is reenergized, reclosing contact 195a and reopening contact 195b to again pulse the south stepper motor 137. This process continues until contact number 16 is closed on all three decks, at which time coil 195 no longer becomes energized. Instead, a circuit is completed through contact 16 of deck 2 to relay coil 197. Although closure of stepper contacts 15 would normaly have reversed the direction of stepper switch operation by reason of the fact that pushbutton travel selector switch 175 was closed, prior to the beginning of operation, the fact that the system is not yet synchronized with the position of the tripper prevents this reversal from occurring, contact 227b (FIG. 5C) in line 157 of the supply to deck one of stepper 138 being open.

At the same time that the stepper switch 138 starts moving toward its contacts number 16, the tripper 20 is caused to move in the south direction for positioning over bin number 16. This occurs as follows. When coils 140 and 182 were energized, contacts 140c and 182a closed, completing a circuit in the remote contactor power network 179 from line 106 through line 193, conduit 194, line 193 (FIG. 7) in the remote reversing contactor 76, through remote south run reversing contactor relay coil 211, line 212 to normally closed contact 71' of the south reversing limit switch 71, through line 213 and normally closed overload contacts 112c and 112d to conduit 214 and line 213 (FIG. 5C) to complete the circuit to power line 105. Energization of south run relay coil 211 shifts corresponding contact 211a, which permits energization of motion simulator switch coil 250 in the motion simulation circuit 249 (FIG. 5B), shifts reversing contact 211b of the phase reversal switch 102, opens interlock contact 211c and closes self-holding contact 211d. Closure of contact 211b would apply phase A and C power to the tripper drive motor 48 except for the fact that motor switches 103 and 104, which are used during manual operation of the tripper, are normally open. To close one of these sets of motor switches and thus to permit automatic control of motor 48 by means of phase reversal switch 102, starter button 95 (FIG. 6) on the tripper is depressed, thus energizing the tripper power control latching relay 216, which is thereby connected across lines 46 and 47. Connected in series with coil 216 is the safety lockout switch 217 which is normally closed, but may be depressed to prevent energization of motor 48 for automatic control purposes. Energization of coil 216 closes contact 216a, which is mechanically latched in a closed position to provide an energization circuit for north run coil 108 when starter button 95 is released. The circuit from line 46 through mode switch 107a, contact 216a, starter button 95 and its contacts 96, contacts 109b and 112a, contacts 66' and switch 217 to line 47 serves to bypass the manually operated north and south start and stop buttons 110, 111, 113 and 114. Energizing coil 108 closes contacts 108c to permit energization of motor 48 through motor switch 103 by the power applied to lines 45 and 47. Contacts 108c remain closed during automatic operation of the tripper and motor reversal is accomplished by means of phase reversing switch 102.

Closure of reversing contacts 211b (FIG. 8) and motor switch 103 causes the tripper motor 48 to rotate in such a direction that the tripper drive mechanism 218 causes tripper 20 to move toward bin 16. As the tripper moves along its track, the proximity switch 219, which is carried by indexing probe 35, closes and then reopens as it passes by each indexing bar at the various bin locations. Closure of proximity switch 219 energizes proximity relay 220 by means of current supplied through transformer 221, shifting the corresponding contact 220a periodically for a length of time corresponding to the duration that 220 is energized. Closure of contact 220a completes a circuit from line 46 through tripper console pulsing circuit collector 53, control trolley conductor 56, conduit 123, conductor 56, proximity switch relay coil 222 in circuit 124 (FIG. 5C) to line 105, thus pulsing relay 222 each time an indexing bar is passed by the tripper. Energization of relay coil 222 shifts contacts 222a–c; however, these contacts have no effect on the circuit at this time inasmuch as synchronization between the stepping switch and the tripper location has not been achieved and the proximity switch is therefore not in control of the tripper. Normally open contact 222a is in circuit with the stepper switch 138, and serves to provide its motors with driving pulses after synchronization has been attained and coil 195 no longer provides the required pulses. Contact 222b responds to the energization of relay coil 222 to open the control console power interlock circuit 207 of warning relays 200 and 201. Thus, if 222b fails to open within the prescribed time limits for normal operation of the tripper, relays 200 and 201 will shut down the system automatically. Contact 222C, located in the reversing control circuit 231 (FIG. 5C), periodically opens to deenergize the circuitry connected to line 223, to be described.

When the tripper reaches the end of its south run, the south reversing limit actuator 74 strikes the south reversing limit switch 71, opening contact 71' and closing contact 71". This opens the circuit through south run relay coil 211 and closes a circuit which may be traced from power supply line 187 (FIG. 5C) through line 224, conduit 225, line 224 (FIG. 7), contact 71", line 226, conduit 225, line 226 (FIG. 5C) and, when the stepper switch 138 reaches its contact 16 to energize relay 197, through closed relay contact 197a and normally closed contact 227d to energize synchronizing relay 227 in the synchronizing control circuit 232. The current so applied to line 226 also passes through line 228 to energize turnaround, or reversing, relay 229 in the reversing control circuit 231 through normally closed contact 229b. When south run relay coil 211 was deenergized by the opening of contact 71', contacts 211b opened and power was removed from drive motor 48, bringing the tripper to a halt. Since power control relay 216 (FIG. 6) is of the self-latching type, removal of power from lines 45 and 47 does not disable the north run relay coil 108; therefore the tripper will restart upon restoration of power to these lines, for coil 108 will then be reenergized to again close contacts 108C. Thus the tripper can be halted long enough to permit the synchronizing and reversing relays to fall into place and can be restarted again without requiring manual operation of switch 95.

The presence of a control signal on line 226 (FIG. 5C) by reason of the closure of contact 71" energizes a ten second delay slow pickup timing relay 230 in the synchronization timing and protection circuit 233. This relay has a delay period before picking up its corresponding contact to permit the stepping relay 195 to shift the stepper switch 138 to contact 16 before the synchronizing relays are energized. At the end of its delay time, coil 230 shifts its corresponding contact 230b to complete a circuit bridging south travel push button switch 178 and to close contact 230a to complete a circuit between line 226 and line 228 to energize coils 227 and 229 in the event that relay coil 197 has not already done so by closing contact 197a.

Energization of synchronizing relay coil 227 shifts the corresponding contacts 227a through 227h to place the operation of the tripper under the control of the stepping switch 138. Contact 227a in remote contactor power circuit 179 opens one of the normally closed alternative paths from power line 106 to line 235; switch contact 227b closes to connect line 157 to line 187 and thus places the pushbutton north and south travel switches in the operative circuit; coil 227 opens contacts 227c and 227d in the energizing paths of coil 227 and closes contact 227e to provide a holding circuit for itself to make its energization independent of relay coil 197. The synchronizing relay coil 227 opens contact 227f in the stepper synchronization circuit 205 (FIG. 5B) to disable the stepping switch pulsing relay 195; closes contact 227g to permit pulsing of stepping switch 138 by the proximity switch; and opens contacts 227h in the stepper switch synchronization timing circuit 206 to deenergize relay coil 198 which has been holding contact 198a open to prevent pulsing of the stepper switch by the proximity switch before synchronization has been accomplished. The concurrent energization of turn-around, or reversing, relay coil 229 by the signal appearing on line 226 operates the corresponding contacts 229a through 229g. Contact 229a opens another alternative path between power line 106 and line 235 in circuit 179; contact 229b shifts to open the energization path of relay 229 through contact 197a; contact 229c opens an alternative energization path for 229; contact 229d provides a holding circuit for relay coil 229 by way of line 223; activation of contact 229e (FIG. 5B) opens the energizing circuit of stepper switch 138 to prevent movement of the stepper during the changeover of the relays to effect reversal of the tripper; and 229f and 229g close alternative paths to a reversing relay repeater coil 236 in a reversing relay repeater control circuit 234. Energization of coil 236 through contact 229f closes self-holding contact 236b and closes contact 236a in circuit 179 (FIG. 5C) to provide a closed path to line 235 from power source line 106.

When control current is applied to line 228, either through energization of coil 197 or coil 230, a path is completed through energized interlock contact 140b, which is closed by reason of the energization of coil 140, and line 237 to energize north direction coil 160. To insure the sealing in of north direction coil 160 when the stepper switch reaches contact 16, contact 230b is closed by coil 230 providing a circuit from line 187, through line 157, contact 16, contact 230b, line 159 and coil 160 to line 105. Energization of coil 160 shifts its corresponding contacts 160a–e to shift the tripper from south travel to north travel. Contact 160a completes a circuit to line 238 (in circuit 179) which passes through conduit 194; contact 160b opens the connection between line 191 and line 192 in south direction relay control circuit 139 to deenergize south direction relay 140, thus opening contact 140c in line 193 and deenergizing south run relay coil 211 in the remote contactor 76. Contact 160c and contact 140d close to connect line 191 to line 239 to provide control power to the south travel selector switches 161 through 176, contact 160d closes to permit reenergization of south direction relay 140 at the appropriate time, and contact 160e (FIG. 5B) is closed to permit energization of north stepper motor 137' of stepper switch 138 by way of diode bridge 204, contact 140a in the circuit of stepper motor 137 being opened by the deenergization of coil 140. Closure of contact 160a permits power to flow from line 106, through contacts 135c and 182a, through lines 240 and 238, through the now-deenergized contact 211c (FIG. 7), through north run relay coil 241 and line 242; through conduit 214, through line 242 (FIG. 5C), through energized switch 135e and line 243 back through conduit 214, through line 243 (FIG. 7), through normally closed contact 72' of the north reversing limit switch 72, to line 213 and thence to power supply line 105. Energization of north run relay soil 241 shifts contacts 241a–d. Contact 241a is in circuit with the motion simulator switch coil 250, contact 241b is a part of phase reversal switch 102 (FIG. 8) and serves to apply power in a reverse phase to change the direction of rotation of motor 48; contact 241c is an interlock with south run coil 211; and 241d provides a holding circuit for coil 241 through line 235, conduit 194, line 235 (FIG. 5C), and through one of the switch contacts 227a, 229a or 236a.

Thus, the application of a control signal on line 226, which occurs when the tripper reaches the south limit switch 71, serves to deenergize the south direction control circuitry and energize the north direction circuitry while at the same time synchronizing the stepping switch 138 with the position of the tripper and placing the tripper under the control of the console circuitry. The energization of north run coil 241 and the resultant closure of contact 241b causes the tripper to start running in a north direction. Since the synchronizing switch has placed the proximity switch in the control circuit, the stepper switch is pulsed to move with the tripper and to provide an indication of its position. It should be noted that while relay coil 227 provides synchronization of the tripper and stepping switch 138, relay coil 229 is provided to allow orderly change of tripper direction by first dropping out the south run coil 211 or, as will be seen, the north run coil 241, then changing north and south direction coils 140 and 160 so that the reverse direction relay coil 211 or 241 can pick up to cause the tripper to move in the opposite direction. Any desired amount of delay time may be obtained in the reversal procedure at this point by modifying the circuit of coil 229 to initiate slow-pickup relay coils in line 192 and 237 instead of directly energizing coils 140 and 160.

To insure that there is a proper delay period between the deenergization of one reversing coil (e.g. south run relay 211) and the pickup of the other reversing coil (north run relay 241), the tripper motion simulation circuit 249, with its relay coil 250 (FIG. 5B), is provided. This relay coil is connected across the power lines from line 105 through lines 251, conduit 252, line 251 (FIG. 7), one of contacts 211a or 241a, line 253 and back through conduit 252 to FIG. 5A where line 253 is connected to power line 106. The energization of either south run reversing contactor relay 211 or north run reversing contactor relay 241 will energize coil 250 to shift its corresponding contacts 250a and b. Contact 250a is in circuit with lines 193 and 238 of power circuit 179, so that upon energization of the south run relay coil 211 or the north run relay coil 241, respectively, these lines will be opened, forcing the respective coils to rely on their holding circuits through contacts 211d or 241d and line 235 for energization. This places coils 211 and 241 in circuit with contacts 227a, 229a and 236a, placing the reversing contactor relay coils under the control of synchronizing relay 227 and turn-around relays 229 and 236.

Contact 250b is in circuit with turn-around relay repeater coil 236 in control circuit 234 (FIG. 5B) to prevent its energization prior to the denergization of coils 211 and 241. When both 211 and 241 are deenergized, contacts 211a and 241a will both be open and motion switch 250 will be deenergized, permitting contacts 250a and 250b to close. Thus, coil 250 insures that south run reversing contact 211b will drop out before north run reversing contact 241b is picked up.

As the tripper reaches bin 16 and activates south limit switch 71 to provide the control signal on line 226 and initiate the reversal above-described, the proximity switch is placed in the active control circuit. Inasmuch as the indexing bar on bin 16 coincides with the position of the south limit switch 71, the proximity switch 219 is closed to energize proximity relay 220 (FIG. 6) and thus to energize proximity switch relay coil 222 in circuit 124 (FIG. 5C). This energization of coil 222 takes place after the reversal operations described above have been completed and serves to open contact 222c in line 223 and thus to denergize the turn-around relay 229. Deenergization of coil 229 permits contact 229e to close, thus allowing stepper 138 to be energized by pulses from the proximity switch, and opens contact 229f and 229g to deenergize coil 236. Deenergization of coil 236 opens contact 236a, but contact 229a closes to retain current on line 235.

As the tripper starts on its north run and leaves the south limit switch 71, it mechanically flips this switch to open contacts 71", and close contacts 71'. This removes the control signal from line 226, but has no effect on the control circuitry, for the synchronizing relay 227 remains energized through its holding contact 227e. As the tripper moves on its north run, toward bin location 1, the indexing bars pulse the proximity switch and apply pulses to the north stepper motor 137', causing the contacts on decks 1, 2 and 3 of stepper 138 to close and then open sequentially, one switch closing with each pulse and opening at the beginning of the next pulse. The tripper continues in this manner until the selected point in the north run is reached. Since bin location number 2 has been selected for purposes of illustration, when stepper switch contact number 2 closes, a circuit is completed between control power line 187 and power line 105 by way of energized contact 227b, line 157, contact 2 on deck 1 of stepper 138, pushbutton switch 142, line 158 and south direction relay coil 140. Energization of coil 140 opens contact 140d, breaking the connection between line 191 and coil 160 and deenergizing coil 160. Contact 140c is closed in an attempt to apply power through line 193 to close the south run coil 211. However, by reason of the fact that north run relay 241 is energized and thus motion switch relay coil 250 is also energized, contact 250a is held open and prevents energization of line 193 until after deenergization of coil 211. At the same time that coil 140 is energized by current through switch 142 and line 158, reversing coil 229 is energized by way of line 158, interlocking contact 160d, normally closed contact 229c and line 223. Energization of coil 229 closes self-holding contacts 229d so that this reversing relay will remain energized sufficiently long to effect reversal of the tripper. Contact 229a opens to deenergize line 235 and thus to deenergize north run coil 241, in turn opening contacts 241b and stopping the tripper. This deenergizes coil 250 and permits energization of south run coil 211 by way of line 193, closing contacts 211b and reenergizing coil 250. At the same time, contacts 160e and 140a in the stepper switch 138 circuit shift so that south stepper motor 137 is placed in the circuit and north stepper motor 137' is removed from the circuit. The tripper then begins to move south and will continue in this manner until the preselected point of reversal is reached. Movement of the tripper from bin location number 2 will, as before, pulse the proximity switch and open the holding circuit for turn-around relay coil 229. When the tripper reaches its preselected point, here bin location number 15, a circuit will be completed through contact 227b, line 157, pushbutton switch 175, line 159 and coil 160. Completion of this circuit will reenergize turn-around relay coil 229 through line 237 and contact 140b to initiate another reversal of the tripper. The tripper thus will continue to cycle between the selected bin locations 2 and 15 until the traversing points are changed, until an overfull, overload or choke-up condition occurs, or until the system is shut down.

In the event that one of the north travel selector switches 141 through 156 has not been properly engaged, a relay is provided which will automatically reverse the direction of the tripper upon activation of the north reversing limit switch 72 at bin 1. When the reversing switch 72 is engaged by the north reversing limit actuator 73 carried by the tripper, normally closed contact 72' is opened and normally open contact 72" is closed. This completes a circuit from line 187 (FIG. 5C) through line 224 and conduit 225 to line 224 (FIG. 7), contact 72''', line 254, through conduit 225 to line 254 in FIG. 5C and through protective relay coil 255 to power supply line 105. The current in line 254 energizes reversing relay coil 229 by way of contact 229c and energizes south direction relay coil 140 by way of contact 160d and line 158. This serves to reverse the direction of the tripper in the above-described manner. Coil 255 closes contact 255a which shunts switch 141, corresponding to bin 1, to insure that south direction relay coil is energized long enough to seal in properly and thus to establish its holding circuits. When the tripper starts to move in the reverse direction, actuator 73 returns switch 72 to its previous position and deenergizes coil 255.

In the event that an emergency situation arises, such as an overfull condition in one of the bins, the system will deactivate the control console and the tripper will control itself, moving in one direction or the other for predetermined periods of time and then stopping. The tripper will remain stopped until another overfull condition occurs in the bin over which it has stopped and then will move on for another predetermined period of time. When it reaches the limit of its run in the direction in which it is moving, it automatically reverses and continues the same type of operation in the opposite direction. Throughout the emergency situation, an alarm sounds to warn the operator of the situation. Activation of probe 81 causes the system to switch to autonomous control, and the operation of this system will be described below.

Assume, for example, that during the course of travel of the tripper along its prescribed north run, the probe 81 makes contact for a predetermined time with ore in bin 14, indicating that bin 14 is overfull. This contact completes a circuit between the probe and the tripper frame (ground) to energize coil 130. As has been described above, energization of coil 130 shifts contact 130a to energize the timed delay, slow pickup relay 132, which, after a predetermined lapse of time, will energize the program timer relay coil 260 through closure of contact 132a. Coil 132 also closes contact 132b to energize the relay unlatching coil 216', which results in the opening of contacts 216a and 216b to remove the tripper from console control by deenergizing master relay 135. When coil 216' unlatches holding circuit contact 216a, north run coil 108 is deenergized, opening motor switch contacts 103 and deenergizing the tripper motor. At the same time, program timer coil 260 activates holding circuit contact 260a and closes contact 260b to complete a circuit through bin overfull relay 261. Energization of relay 261 causes warning light 262, located on the tripper itself, to go on and activates the alarm circuit 126 at the console by closure of contact 261e. Relay 261 also activates self-holding contact 261a and further activates contacts 261b and 261c in circuit with the north run and south run relay coils 108 and 109, respectively.

When master relay coil 135 is deenerized by the opening of contact 216b, its corresponding contact 135a returns to its normally closed condition, applying power from line 106 through line 238 and conduit 194 to the north run relay 241 (FIG. 7), through line 242 and conduit 214, through normally closed contact 135f to power line 105. This energizes coil 241 and closes contacts 241b to restore three-phase power to the tripper through lines 45, 46 and 47. It will be remembered that energizating of the tripper when it is being operated under manual control also is accomplished through contact 135a and the resultant energization of coil 241. The power thus applied to lines 45, 46 and 47 will not, of itself, cause the tripper to run, however, since the control console is deenergized. Motor 48 will only be energized by closure of motor switches 103 or 104 either under manual control or under autonomous control.

Connected to the shaft of motor 48, either directly or through an intermediate gear reducer, is a motion switch 263 having a pair of normally-closed contacts 263a and 263b in the self-control circuitry of the tripper. This motion switch provides an interlock which prevents any mode of control from reversing the motor 48 while the tripper is in motion in either direction. Contacts 263a and 263b are both closed when the motor 48 is at rest, to permit the tripper to be started in either direction, but upon energization in the north direction of travel, contact 263b will open to prevent energization of the south run relay 109. Similarly, upon energization of the motor for south direction travel, contact 263a will open to prevent actuation of the north run relay 108.

Closure of contacts 261b and 261c upon occurrence of an overfull condition places contacts 70' and 70'' respectively, of the self-control limit switch 70 in circuit with the north and south run relays 108 and 109, respectively. Contacts 70' and 70'' are mechanically interconnected so that only one may be closed at a time. Assuming that contact 70' is closed, a circuit will be completed from line 46 through mode selector switch 107b, through contact 263a of motion switch 263, contact 261b, contact 70' and north run tripper relay coil 108 to power line 47. This will activate contacts 108c of motor switch 103 and will cause motor 48 to become operative to drive the tripper in its north direction and open contact 263b. By reason of the fact that programmed timer coil 260 remains energized for only a predetermined period of time, the tripper will move north only for this predetermined time, for example, ten seconds. Coil 260 will then drop out and the tripper will stop. The tripper will remain at that point until the bin over which it has stopped becomes overfull. Coil 130 will then become energized again, closing switch contact 130b to reenergize coil 260 and cause the tripper to move north for another ten seconds. This cycle will continue until the tripper reaches the north end of its run, at which time reversing limit actuator 68, mounted on bin 1, will engage switch 70 and open contact 70'. Contact 70'' will then close and energize south run tripper relay coil 109, closing contacts 109c of motor switch 104 and causing the tripper to move in the opposite direction for the periods of time determined by program timer relay 260. The tripper will continue to hunt for empty bins in this manner, while continually sounding an alarm, until the operator takes some action to correct the situation.

Included in the central control console with the operating equipment above-described is a unique system of bin level determination. This system consists of the sensing devices at various levels of the bin locations which were described with respect to FIGS. 1 through 4 and which are illustrated therein at 31, 32 and 33. Each of these sensing probes is connected back to the control console and each probe of a given level is connected to a corresponding stepping switch for that level. In this example, there are three sensing probe stepping switches in addition to the tripper location stepping switch 138 already described. A programmed timer, which may run on a twenty-four hour basis, periodically causes a pulsing device to step each of the probe stepping switches to check each bin level sensing probe and to relay status information so obtained to a set of corresponding annunciators.

FIG. 5A illustrates the bin level determining mechanism for the level represented in FIG. 1 by the probes 33, it being understood that the circuitry directed to this particular level is duplicated for the additional probe levels. It will be apparent that any practical number of probe levels may be used with this system, three levels having been shown here for purposes of illustration. The driving coil of a sensing probe interrogation stepping switch 265 is connected across lines 105 and 106 through a motor-driven pulsing device 266 and a diode bridge 271, rotation of the motor 267 causing eccentric cam 268 to rotate and to open and close contact 266. This provides periodic pulses to stepping switch 265, causing it to sequence its contacts. Similar bin level interrogation stepping switches 269 and 270 are energized by pulsing device 266 to sequence their respective switch contacts (not shown) for interrogating probe levels 31 and 32. Motor 267 is activated by means of program timer relay coil 273 which periodically closes contact 273a to energize the motor. In a preferred embodiment of this invention, program timer relay 273 closes contact 273a for a period of 15 seconds every 30 minutes, thus providing an interrogation of all the bin level probes every 30 minutes. A pushbutton lock switch 274 with lockout mechanism is provided in series with coil 273 to deactivate the bin level sensing mechanism, if desired.

Stepping switch 265 has three mechanically interconnected decks of contacts, labeled in FIG. 5A as decks A, B and C. As may be seen, each deck includes 16 switch contacts, each of which is closed once during the period that motor 267 is energized. Each contact of deck A is connected between a relay coil 275 and a corresponding level probe in one of the ore bin locations 1 through 16, by way of conduit 85. Thus, for example, contact 1 is connected through line 276, conduit 85, and line 276 in FIG. 1 to be connected to probe 33 of bin 1. Similarly, each of the other contacts are connected to the "low" probe 33 of the corresponding bins. As has been noted, the probes herein illustrated are designed to utilize the conductive characteristics of the ore being carried in the bins, and it will be apparent that many other level sensing devices can be used in this system. With the illustrated system, if probe 33 presents an open circuit, then the ore has not reached the level of that probe; on the other hand, if the probe presents a closed circuit, then the ore has reached its level. If the level in bin 1 is above that of probe 33, when stepping swtich 265 closes its number 1 contacts, a current will flow through line 276, induced therein by primary winding 277 connected across lines 105 and 106. This induced current flowing through the closed circuit energizes relay coil 275 to close contact 275a. Any time a circuit is completed through one of the contacts on deck A by reason of the ore level being at or above its corresponding probe, coil 275 will be energized to close 275a.

Each of contacts 1 through 16 of deck B of stepper switch 265 are connected through contact 275a to line 106 on one side and through annunciator coils 281 through 296, respectively, to line 105. Associated with each annunciator coil is a corresponding indicator lamp which lights upon energization of its coil. Each coil becomes energized only when closure of its corresponding bin contact on deck B corresponds with closure of contact 275a. Thus, following the example where the level of ore in bin 1 is above the level of probe 33, upon closure of contact 1, deck A, the coincident closure of contact 1 on deck B will be accompanied by closure of contact 275a. This will "set" the annunciator coil 281 and light its corresponding lamp 281'. Coil 281 will then remain set and lamp 281' will remain illuminated until that coil is reset prior to the next interrogation cycle. Deck C of stepping switch 265 carries the "reset" contacts for annunciator coils 281 through 296. These contacts are arranged to reset each coil one step in advance of the closure of its corresponding "set" contact on deck B. Thus, the first contact in the sequence of deck C is a zero contact and resets coil 281 prior to the closure of contact 1 of the three decks. While bin 1 is being interrogated by closure of contacts 1 on decks A and B, annunciator coil 282 is being reset by closure of contact 1 on deck C. The closure of the corresponding reset contacts completes a circuit between lines 105 and 106 through the respective annunciator coils to extinguish their corresponding lamps if they were lit at this time.

Each level of the probes includes a set of interrogation contacts and annunciator coils such as those above-described, the respective levels being driven by stepping switches 269 and 270. The illustrated level of probes and annunciators senses the lowest level in each bin and thus is labeled "low." The annunciator lights are located on the front panel of the control console and are labeled "bin level indication." The low level indicator lamps illustrated in FIG. 5A are located at level L and the lamp 281' for bin location number 1 is indicated there. After all three levels, low, half-full (H) and full (F) of the bin probes have been interrogated, the amount of ore in each bin will be indicated clearly on the front panel of the console.

Connected in parallel across lines 105 and 106 are sixteen lamps 301 through 316, each lamp corresponding to one of the bin locations 1 through 16. Connected in series with each lamp is a group of three normally closed switches, each switch being associated with an annunciator coil for one of the three probe levels corresponding to its bin location. Thus, for example, switches 317, 318 and 319 are connected in series with lamp 301 whereby lamp 301 is normally illuminated. Switch 317 is associated with annunciator coil 281 and opens when coil 281 is set. Similarly, switches 318 and 319 are associated with bin number 1 probe levels 32 and 31, respectively, and are opened when their corresponding annunciator coils (not shown) are energized. Opening of any one of switches 317, 318 or 319, will, of course, extinguish lamp 301 as the energized annunciator turns on its associated lamp in the manner above described. Lamps 301 through 316 are indicative of empty bin locations and are extinguished whenever their respective bins and are labeled "low." Similarly, the one of the corresponding higher level annunciator circuits. Thus, the switches corresponding to switch 317 in the remaining lamp circuits are indicative of a low ore level in their respective bins and are labeled low." Similarly, the switches corresponding to switch 318 in the remaining lamp circuits 302–316 correspond to a half-full condition of the bins and the switches corresponding to switch 319 indicate a full bin condition. Thus, when all of bins 1 through 16 are full all the lights on the console panel in the rows labeled F, H and L will be illuminated while the lights in the row labeled E will be out.

Although the preceding description has been in terms of electromagnetically operated relays and their corresponding switch contacts, it is apparent that the system is equally well adapted to the use of solid state logic circuitry. In such an embodiment, the relay coils of the preceding figures are replaced by suitable trigger circuits, flip-flops or the like, such circuitry having one output signal corresponding to the deenergized condition of the equivalent relay and having a second output signal corresponding to the energized condition of the relay. Thus the presence of the absence of a particular output signal will correspond to the opening or closing of a switch contact and is the full equivalent thereof.

The solid state embodiment of the invention is illustrated in FIGS. 12 to 26, using a diagrammatic method of illustrating the system logic. However, to correlate this embodiment with the previous one, elements which correspond functionally have been given corresponding numbers. Thus, for example, where a logic AND circuit produces an output signal upon the occurrence of three input conditions, which conditions would correspond to the energization or deenergization of certain relay contacts, these input conditions are given the numbers of their corresponding mechanical equivalents. This is illustrated in FIG. 13 where the operation of a relay K4 is dependent upon the absence of one signal and the presence of another signal, or in other words, the presence of a "not" signal and the presence of a second signal. In the logic system, these signals would be obtained from the appropriate output of corresponding flip-flops or trigger circuits. However, the function of this circuit corresponds to the closure of two series contacts, normally closed contact 182d and normally opened contact 135g (FIG. 5B). Since the energization of relay K4 depends upon contact 182d remaining closed, one of the input conditions for the operation of K4 is the presence of a signal representing the nonenergization of this contact. This is indicated in FIG. 13 by a bar over the input 182d, i.e., $\overline{182d}$. Similarly, in order to energize relay K4, contact 135g must be energized, i.e., closed, and therefore the second input is indicated as 135g. When both of these conditions are fulfilled, as required by the AND circuit, then an output is produced to energize K4. In a similar manner, an OR circuit produces an output signal when one or more of its input conditions are satisfied. Generally, therefore, an AND circuit is seen to represent a series arrangement of contacts, while an OR circuit represents a parallel arrangement of contacts.

Figure 12:
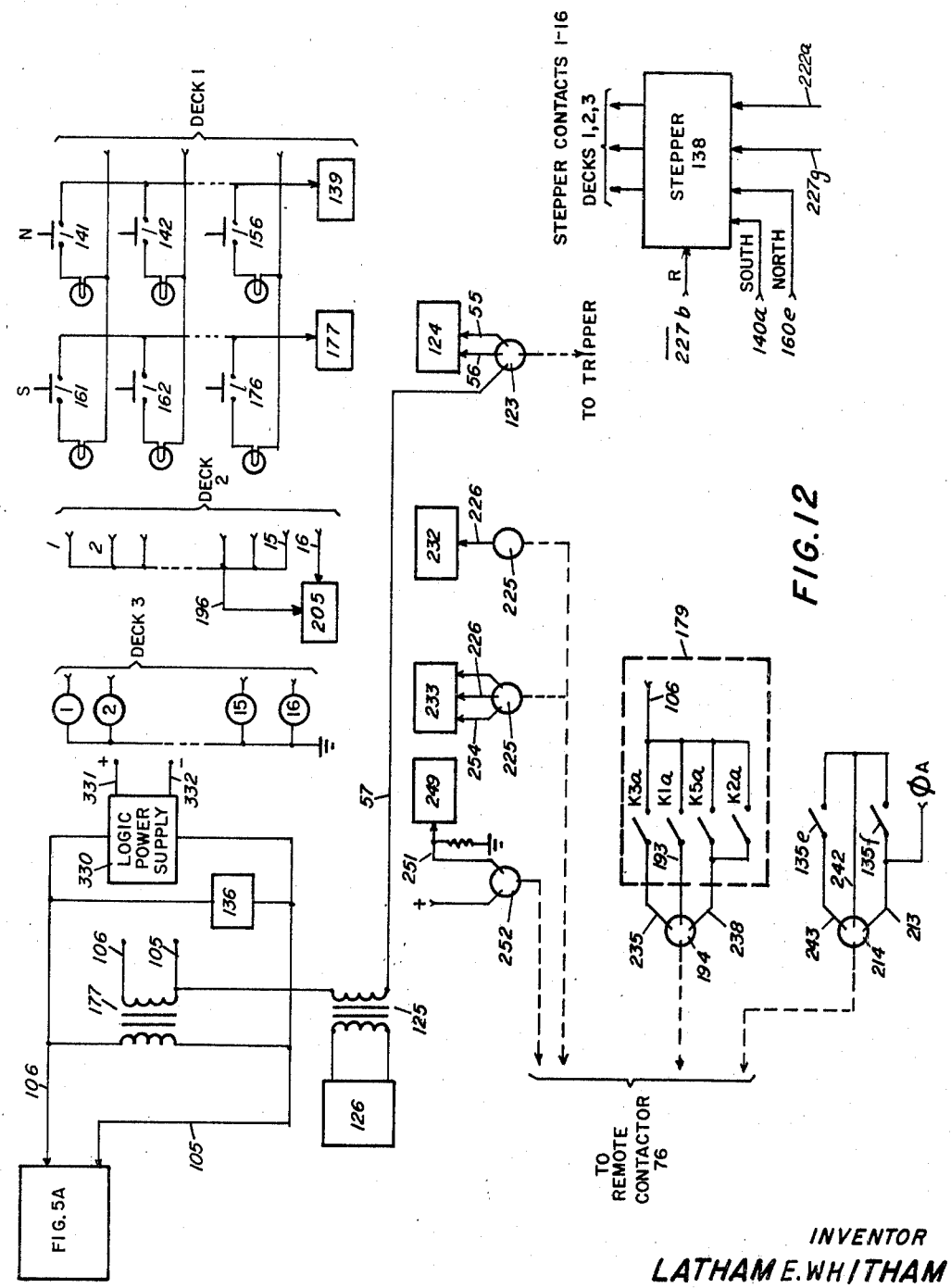
FIG. 12 is a diagrammatic illustration of a second embodiment of the control console of the present invention.

FIG. 12 is a highly diagrammatic representation of the system of FIGS. 5B and 5C, illustrating the manner in which solid state logic circuitry can be adapted to this system. The various blocks shown in FIG. 12 correspond to the various control and power networks of FIGS. 5A and 5C and are similarly numbered. The blocks shown in this figure are limited to those which are directly connected to the power supply, the stepping switch, and the several conduits, inasmuch as the remaining networks are so interconnected that the diagramming of them would serve only to confuse. However, these other networks are illustrated in the succeeding figures, from which the interconnections will be apparent.

Power for the logic units will be a direct current of such voltage as may be required by the particular units used and of sufficient current capability to supply the needs of the system. The power connections are not shown in the various figures, but the source of this power is illustrated in FIG. 12 at 330. The logic power supply 330 is connected across the secondary of transformer 177 to receive alternating current from lines 105 and 106. The logic power supply is arranged to produce a direct current of suitable voltage at terminals 331 and 332. Also connected across lines 105 and 106 is the console power failure alarm 136. The bin overfull alarm 126 is connected through transformer 125, line 57 and conduit 123 to the tripper in the manner above described with respect to FIG. 5C. Also connected to conduit 123 is the master relay and proximity switch circuit 124. The north run pushbutton switches 141 through 156 and the south run pushbutton switches 161 through 176, which cooperate with the contacts of deck 1 of stepper 138, are diagrammatically illustrated. As shown, the north direction pushbuttons activate the south direction relay control circuit 139, while the south direction pushbuttons activate the north direction control circuit at 177. Also diagrammatically illustrated in FIG. 12 is the stepper sychronization circuit 205 which cooperates with the deck 2 contacts of stepper 138 and the indicator lights 1 through 16 which cooperate with the deck 3 contacts.

Stepper 138 may be a forward and backward solid state counter having a suitable number of outputs corresponding to the contacts of the mechanical stepper switch. As may be seen from FIGS. 5B and 12, operation of stepper 138 in the forward direction requires input signals corresponding to the closure of either contact 140a or 160e, depending upon whether north or south operation is desired. These signals operate gate circuits in the stepper-counter 138, but do not effect the count. Reset input $\overline{227b}$ forces the stepper 138 to position 16 and holds it there until energization of the synchronization relay 227, thus preventing other inputs from interfering with the count. When system synchronization has occurred, input 227g is energized, and the stepper-counter responds to the pulsed input signal 222a. In the circuit of FIG. 5B the relay contact 229e is required to prevent a false count in stepper 138 upon opening and closing of contacts 140a and 160e during reversal, but this contact can be eliminated in the solid-state configuration since 140a and 160e do not affect the count.

FIG. 12 also diagrammatically illustrates the connections of the conductors carried by the several conduits to the control system. Thus, conductor 251 of conduit 252 is connected to the motion simulation circuit 249 and the conductors carried by conduit 225 are connected to the synchronizing control 232 and the synchronizing timing and protection circuits 223. Conductors 193, 235 and 238 are carried by conduit 194 and are connected to the remote contactor power circuit 179 having contacts K1a, K2a, K3a and K5a connected to power supply line 106. These contacts are operable in response to the control logic at 179' in FIG. 26, and thus correspond functionally to the circuitry illustrated at 179 in FIG. 5C. Conductors 213, 242, and 243 of conduit 214 are connected as in FIG. 5C.

To further illustrate the manner in which the control network of the console illustrated in FIGS. 5B and 5C may be converted to a logic array, reference is now made to FIGS. 13 through 26 which illustrate the logic units of the block diagrams of FIG. 12. FIG. 13 shows the console power failure alarm 136 which is energized upon closure of contact K4a. This contact is energized by relay coil K4 which, in turn, is energized by an output signal from the AND circuit 340. As has been described above, the AND circuit produces an output signal upon the receipt of signals corresponding to the deenergization of normally closed contact 182d and upon the energization of normally open contact 135g.

FIG. 14 illustrates the logic circuit for the stepper synchronization circuit 205 which includes relay coils 195 and 197. In this embodiment, coil 195 is replaced by a trigger circuit which is its functional equivalent, the trigger circuit producing a 1 output ($\overline{195}$) when at rest and producing a 0 output (195') when energized. Energization of trigger 195 is accomplished by an output from AND circuit 341 having inputs 196, $\overline{227f}$ and $\overline{195b}$. Thus, an input on line 196 accompanied by deenergization of contacts 227f and 195b produces an output from AND circuit 341. Trigger circuit 195 may be a conventional Schmitt trigger or its equivalent. Relay coil 197 is replaced by trigger circuit 197 having a deenergized output $\overline{197}$ and an energized output 197', the trigger circuit being energized by an input signal occurring when the contact 16 of deck 2 of the stepper 138 closes.

FIG. 15 illustrates the logic unit for the south direction relay control circuit 139. A trigger circuit 140, having 1 and 0 outputs $\overline{140}$ and 140', respectively, responds to an output from an OR circuit 342. The OR circuit produces an output upon the occurrence of a signal on either of lines 158 and 192, or both. The appearance of a signal at line 192 depends upon the application to OR circuit 342 of a signal corresponding to the closing of contact 181b or a signal from AND circuit 344, the output of AND circuit 344 depending, in turn, upon the energization of contact 140e and the deenergization of contact 160b (i.e., $\overline{160b}$).

FIG. 16 illustrates the logic units in the north direction relay control 177, showing a trigger circuit 160 having deenergized and energized outputs $\overline{160}$ and 160', respectively. The input to the trigger 160 is by way of OR circuit 345 which responds to an input signal on either line 159 or line 239 to energize the trigger. Line 239 receives its input by way of AND circuit 346 which has inputs 160c and $\overline{140}d$.

The motion stimulation circuit 249 is shown in FIG. 17 as being comprised of a trigger circuit 250 having an input line 251 and 1 and 0 outputs $\overline{250}$ and 250′, respectively. As in prior circuits of similar structure, the $\overline{250}$ output represents a deenergized state and the 250′ output represents an energized state.

The reversing control circuit 231, illustrated in FIG. 18, includes a trigger circuit 229 having 1 and 0 outputs $\overline{229}$ and 229′, respectively. The energizing input for trigger 229 is obtained by way of line 223 from OR circuit 350. This OR circuit has inputs 230b, 255a, an input from AND circuit 351 and an input from AND circuit 352, any of which will produce the required output on line 223. AND circuit 351 has inputs 160d and 140b, while AND 352 has inputs $\overline{222}c$ and 229d. A comparison of FIG. 18 with circuit 231 of FIG. 5C will make it apparent that the OR circuit 350 represents parallel inputs, the AND circuit 352 represents a series arrangement of contacts and circuit 351 represents the simultaneous energization of relay contacts 140b and 160d.

FIG. 19 illustrates a logic array for the synchronizing control circuit 232, which circuit includes a flip-flop 227 having 1 and 0 outputs $\overline{227}$ and 227′. An input $\overline{182}b$ to flip-flop 227 resets it to its quiescent state where its output is $\overline{227}$. Upon energization of contact 182b so that the input $\overline{182}b$ is no longer present, the flip-flop will change from one of its stable conditions to the other upon receipt of succeeding inputs from the AND circuit 255. The AND circuit produces its output signal upon the occurrence of signals through line 226, contact 197a and contact 182b.

FIG. 20 illustrates the synchronization timing and protection circuits 233, which circuits include trigger 230 and trigger 255 responsive to input signals on lines 226 and 254, respectively. Trigger 230 has 1 and 0 outputs $\overline{230}$ and 230′, respectively, while trigger 255 has 1 and 0 outputs $\overline{255}$ and 255′, respectively.

Reversing relay repeater control circuit 234 is shown in FIG. 21, wherein relay 236 is replaced by corresponding trigger circuit 236, the trigger circuit having 1 and 0 outputs $\overline{236}$ and 236′, respectively. Energization of trigger 236 is by way of OR circuit 356 which receives input signals from either of the AND circuits 357 or 358. AND circuit 357 includes inputs $\overline{350}b$, 229f and 182b, while AND circuit 358 includes inputs 182b, 229g and 236b. Energization of either of the series circuits represented by AND circuits 357 and 358 will thus serve to energize trigger 236.

Figure 22:
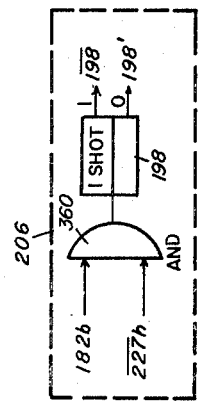

The logic circuitry of the stepper switch synchronization timing network 206 is illustrated in FIG. 22, wherein the one-shot multivibrator 198 produces 1 and 0 outputs $\overline{198}$ and 198′, respectively, in response to an input signal on line 199. The signal on line 199 is produced by an output from an AND circuit 360 which has inputs 182b and $\overline{227}h$.

Figure 23:
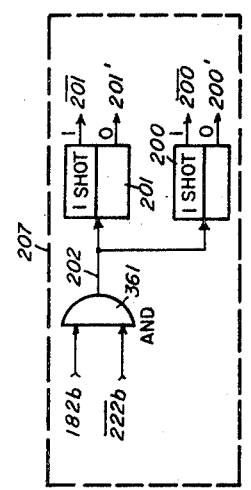

FIG. 23 illustrates the logic array for the control console power interlock circuit 207 and includes one-shot multivibrators 200 and 201 producing their corresponding 1 and 0 output signals. Energization of these multivibrators is by way of line 202 from the output of AND circuit 361, the AND circuit having inputs 182b and $\overline{222}b$.

Figure 24:
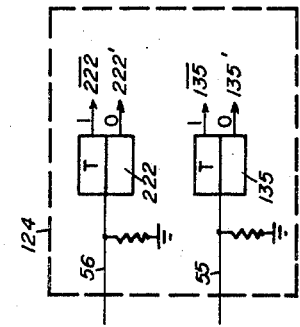

Master relay and proximity switch circuit 124 is illustrated in FIG. 24 as comprising trigger circuits 135 and 222 being energized by signals appearing on lines 55 and 56, respectively. Trigger circuit 135 has the usual 1 and 0 outputs $\overline{135}$ and 135′, while trigger 222 produces 1 and 0 outputs $\overline{222}$ and 222′, respectively.

Figure 25:
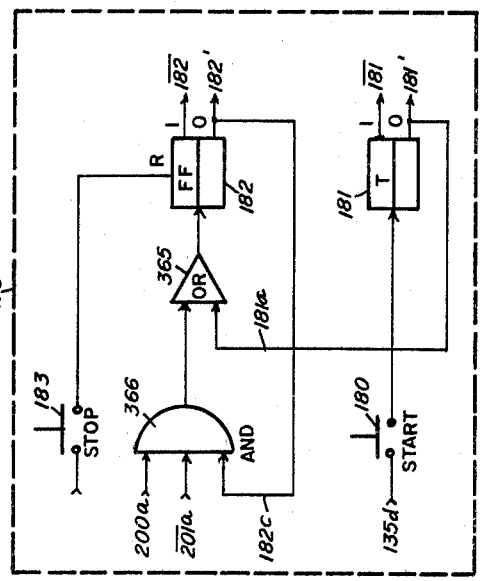

FIG. 25 illustrates the logic circuitry for the control console power supply 178. Flip-flop 182 replaces its corresponding relay and produces 1 and 0 outputs $\overline{182}$ and 182′. The flip-flop may be reset to its deenergized state by means of the stop button 183. Energization of the flip-flop 182 is accomplished by way of OR circuit 365. One of the inputs to OR circuit 365 is from the output of AND circuit 366 which has inputs 200a, $\overline{201}a$ and 182c. The other input of OR circuit 365 correspond to the energization of contact 181a, which signal is derived from trigger circuit 181. This latter trigger circuit has 1 and 0 outputs $\overline{181}$ and 181′ and is energized by means of the start button 180 when contact 135d is closed.

Figure 26:
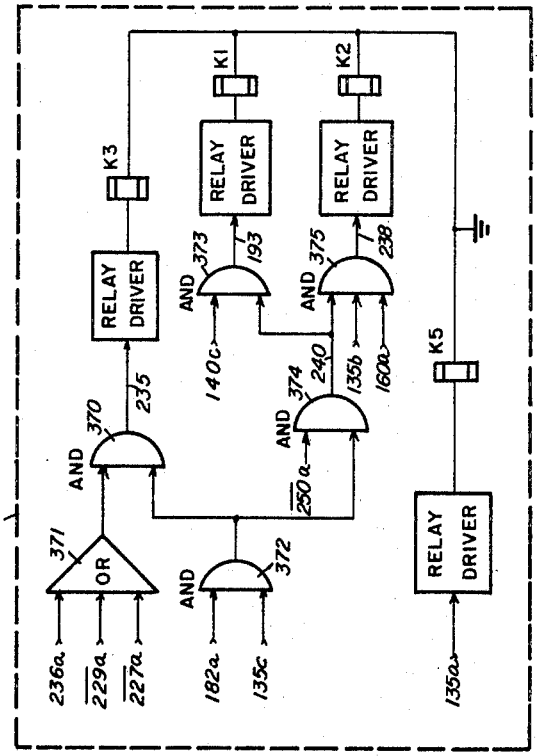

The contacts in the remote contactor power circuit 179 shown in FIG. 12 are operated by means of the corresponding relay coils K1, K2, K3 and K5 in logic circuit 179′ shown in FIG. 26. Relay coil K3 derives its energization by way of a relay driver from line 235 which carries the output signal from AND circuit 370. One of the two inputs of AND circuit 370 is derived from OR circuit 371, which has inputs 236a, $\overline{229}a$ and $\overline{227}a$. The other input of AND circuit 370 is derived from the output of AND circuit 372, which has inputs 182a and 135c. Relay coil K1 receives its energization through a relay driver by way of line 193, which line is the output of AND circuit 373. The inputs to AND circuit 373 are signals representing the energization of contact 140c and the output of AND circuit 374 which appears on line 240. AND circuit 374 has inputs 250a and the output from AND circuit 372. Relay coil K2 is energized by way of a relay driver from line 238 which is the output of AND circuit 375. This circuit has inputs from line 240 and contacts 135b and 160a. Relay coil K5 is energized by way of a relay driver from input 135a. A study of the corresponding circuit 179 in FIG. 5C will make apparent the correspondence between the various AND and OR logic circuits and the series and parallel arrangements of contacts in FIG. 5C. Since the logic circuits are the functional equivalents of the networks of FIG. 5, it is not believed to be necessary to detail the working sequence of this system. Further, it will be apparent from what has been said that the remaining portion of the control circuitry of this invention can be converted to solid state operation utilizing logic circuits in the manner above-described. The logic circuits are typical for AND-OR logic, but other systems such as NAND-NOR may be adopted. It may also be desirable in such a system to replace the power contactors in the motor control circuits, for example, with solid state devices such as silicon controlled rectifiers.

Thus there has been described an efficient, easily maintained automatic system for the conveying and storage of ore or similar materials in an elongate pile, preferably in a plurality of bins, and including a control system for operating the tripper and the conveyor to fill a selected group of bins by traversing between selected points over the bins while discharging material into them. The system further includes an emergency alarm and means for shifting the system to autonomous control upon the occurrence of certain types of emergency situations. Since various modifications will be apparent to those skilled in the art, it is desired that the foregoing description be taken as illustrative.

I claim as my invention:

1. A remote automatic control system for a conveying and storage apparatus comprising:
   conveyor means;
   a traveling tripper for unloading said conveyor;
   means for causing said tripper to traverse along at least a portion of the length of said conveyor;
   emergency control means on said tripper;
   automatic program control means remote from said tripper for regulating the direction and extent of travel of said tripper; and
   means for automatically disabling said automatic program control means in response to occurrence of an emergency condition and for also automatically energizing said emergency control means on said tripper; whereby said tripper unloads said conveyor in a first predetermined pattern until an emergency situation occurs and then unloads said conveyor in a second but different predetermined pattern.

2. The automatic control system of claim 1, further including manual control means on said tripper and selector means for converting from a manual mode of control to an automatic mode of control.

3. The automatic control system of claim 2, further including reversible drive means for said tripper, wherein said manual control means includes first and second drive means reversing switches, first and second relay circuit means for activating said first and second switches, respectively, and manually operable switch means for energizing and deenergizing said first and second relay circuit means, whereby said drive means can be reversed to change the direction of travel of said tripper.

4. The automatic control system of claim 1, wherein said means for disabling said automatic program control means includes sensing means for detecting an emergency condition and operating corresponding sensing switch means, said means for energizing said emergency control means on said tripper comprising a program timer responsive to said sensing means to operate said tripper under autonomous control and to unload said conveyor in said second predetermined pattern.

5. The automatic control system of claim 4, further including reversible drive means for said tripper, said emergency control means on said tripper including first and second drive means reversing switches, first and second relay circuit means for activating said first and second switches, respectively, and first and second limit switch means for controlling the energization of said first and second relay circuit means at the limits of travel of said tripper when said tripper is moving in said second predetermined pattern for reversing the direction of motion of said tripper at said limits.

6. The automatic control system of claim 5 wherein said program timer means responds to said sensing means to permit energization of said first and second relay circuit means for a predetermined period of time, whereby said tripper is moved a predetermined distance along the length of said conveyor.

7. The automatic control system of claim 6, further including alarm means responsive to said sensing means to provide audio and visual indication of said emergency condition, wherein said sensing means comprises at least one probe means in a normally open circuit with sensing relay means, said emergency condition closing said normally open circuit.

8. The automatic control system of claim 1, further including a plurality of bin locations along said portion of the length of said conveyor, said traveling tripper being arranged to unload said conveyor whereby material carried by said conveyor is discharged into said bin locations in said first predetermined pattern.

9. The automatic control system of claim 8, wherein said automatic program control means includes travel selector means for designating a group of said plurality of bin locations, and means responsive to the setting of said travel selector means for causing said tripper to traverse said designated group of bin locations.

10. The automatic control system of claim 9, further including at least one level-sensing probe at each bin location, means for interrogating each of said level-sensing probes sequentially, and annunciator means responsive to said interrogation to provide an indication of the level of material contained in each bin location.

11. The automatic control system of claim 9, further including one level-sensing probe at each of three levels in each bin location, means for interrogating the probes at each level sequentially, and annunciator means for each of said three levels responsive to said interrogation to provide an indication of the level of material contained in each bin location.

12. The automatic control system of claim 10, wherein each of said level-sensing probes is connected in a normally-open circuit with level-sensing relay means and said interrogating means, said material discharged into each of said bin locations serving to close the normally-open circuit of its corresponding level-sensing probe when the level of said material reaches the location of said level-sensing probe and when said circuit is being interrogated.

13. The automatic control system of claim 12, wherein said interrogating means comprises a stepper having a first deck and a second deck of sequentially-closable switches, one of said first deck of switches being connected in circuit with each of said level-sensing probes whereby operation of said stepper interrogates each of said level-sensing probes in sequence, said second deck of switches being connected in circuit with said annunciator means, and means for periodically energizing said stepper to interrogate each of said level-sensing probes.

14. The automatic control system of claim 13, wherein said annunciator means comprises a plurality of annunciator relays, each of which corresponds to a respective one of said level-sensing probes, one of said annunciator relays being connected in series with each of the switches of said second deck, and means for energizing each of said annunciator relays upon closure of the normally-open circuit of its corresponding level-sensing probe, whereby the level of material in each bin location is indicated by the state of energization of its corresponding annunciator relay.

15. The automatic control system of claim 14, further including normally-on indicator means for each bin location and its corresponding annunciator relay and means responsive to energization of an annunciator relay for extinguishing the indicator means corresponding thereto.

16. The automatic control system of claim 9, further including limit switch means located adjacent said conveyor to define the furthest extent of travel of said tripper, said limit switch means being operative when said tripper is under control of said automatic program control means to reverse the direction of travel of said tripper without disabling said automatic control means, said limit switch means responding to actuator means carried by said tripper.

17. The automatic control system of claim 9, further including three-phase drive motor means for said tripper, phase-reversal switching means for reversing the direction of travel of said tripper, and reversing relay circuit means for operating said phase-reversal switching means in accordance with the setting of said travel selector means, whereby said tripper traverses said selected group of bin locations.

18. The automatic control system of claim 9, wherein said automatic program control means further includes stepper means having a plurality of positions corresponding, respectively, to said plurality of bin locations, means responsive to energization of said automatic program control means to drive said tripper to its furthest extent of travel in one direction and to drive said stepper means to a corresponding position, whereby the position of said stepper means having a plurality of positions correspond-tripper, and means for thereafter periodically driving said stepper means so that its position corresponds to that of said tripper.

19. The automatic control system of claim 18, wherein said means for periodically driving said stepper means comprises indexing means at each of said bin locations, switch means carried by said tripper and responsive to each said indexing means for producing a signal to energize said stepper switch.

20. The automatic control system of claim 19, wherein said stepper means includes normally open means for each of said plurality of positions, periodic energization of said stepper means serving to close said contact means sequentially, said travel selector means comprising first and second travel selector switches for each of said plurality of positions and connected in series with said normally open contact means and first and second direction relay circuit means, respectively, the setting of said first travel selector switches establishing the limit of travel of said tripper in one direction, and the setting of said second travel selector switches establishing the limit of travel of said tripper in the reverse direction.

21. The automatic control system of claim 20, wherein closure of the normally open contact means of said stepper means corresponding to the designated one of said first travel selector switches energizes said first direction relay circuit means to initiate reversal of said tripper at the bin location corresponding to the limit of its travel in one direction and closure of the normally open contact means of said stepper switch corresponding to the designated one of said second travel selector switches energizes said second direction relay circuit means to initiate reversal of said tripper at the bin location corresponding to the limit of its travel in the other direction, whereby said tripper is caused to traverse the group of bin locations between the designated locations, said automatic program control means further including turn-around circuit means responsive to energization of either said first or said second direction relay circuit means to effect tripper reversal.

22. The automatic control system of claim 21, further including three-phase drive motor means for said tripper, first and second phase-reversal switching means for reversing the direction of travel of said tripper and first and second reversing relay circuit means for operating said first and second phase-reversal switching means, respectively, in response to energization of said first and second direction relay circuit means, respectively, and concurrent energization of said turn-around circuit means.

23. The automatic control system of claim 18, wherein said automatic program control means further includes a stepper synchronization circuit for driving said stepper means to said corresponding position, and a synchronizing control circuit for thereafter maintaining synchronization between said stepper means and said tripper.

24. The automatic control system of claim 21, further including motion simulation circuit means for effecting tripper stoppage during operation of said turn-around circuit means, and a control system power interlock circuit for shutting down said remote automatic program control means in the event that said tripper fails to operate in accordance with said first predetermined pattern.

25. The automatic control system of claim 24, further including power supply circuit means for energizing said automatic program control means to initiate remote control over the operation of said tripper, said power supply circuit means responding to an emergency situation to discontinue remote control over said tripper.

26. The automatic control system of claim 1, further including a plurality of storage locations along the length of said conveyor traversed by said tripper, said automatic program control means including travel selector means for designating a group of said plurality of storage locations and means responsive to the setting of said travel selector means for causing said tripper to traverse said designated group of locations whereby material carried by said conveyor is discharged in said first predetermined pattern.

27. The automatic control system of claim 26, further including overfull sensing means for detecting overfull conditions at said storage locations, circuit means responsive to the detection of an overfull condition at a storage location to disable said remote automatic program control means and to energize said emergency control means on said tripper.

28. The automatic control system of claim 27, wherein said first predetermined pattern is a point to point traverse of said designated group of stations in which said tripper moves repeatedly between designated points and said second predetermined pattern is a station to station traverse of said plurality of storage locations in which said tripper fills each storage location in turn and is moved to the next succeeding storage location by an overfull condition.

29. The automatic control system of claim 28, further including emergency travel limit means for stopping said tripper upon failure of said emergency control means.

30. The automatic control system of claim 28, further including means for synchronizing said remote automatic program control means with the location of said tripper during said first predetermined pattern of operation.

31. The automatic control system of claim 26, further including means for synchronizing said automatic program control means with the location of said tripper along the length of said conveyor, said means for synchronizing including index means for each of said plurality of storage locations.

32. The automatic control system of claim 31, wherein said means for disabling said automatic program control disables said means for synchronizing, said tripper thereafter being under the autonomous control of said emergency control means to periodically move said tripper predetermined distances along the length of said conveyor.

33. The automatic control system of claim 32, said tripper further including reversing means whereby under autonomous control said tripper repeatedly travels back and forth from one end of said conveyor to the other.

References Cited

UNITED STATES PATENTS

| | | | |
|---|---|---|---|
| 2,097,909 | 11/1937 | Atz | 214—16 X |
| 2,537,005 | 1/1951 | Brown et al. | |
| 2,730,228 | 1/1956 | Greeley et al. | 198—186 |
| 2,852,128 | 9/1958 | Ketola et al. | 198—186 |
| 2,876,914 | 3/1959 | Werner. | |
| 3,052,364 | 9/1962 | Pelzer | 214—16 |
| 3,237,807 | 3/1966 | Garvey | 198—186 X |

GERALD M. FORLENZA, Primary Examiner

ROBERT J. SPAR, Assistant Examiner

U.S. Cl. X.R.

198—186

PO-1050
(5/69)

UNITED STATES PATENT OFFICE
CERTIFICATE OF CORRECTION

Patent No. 3477593              Dated November 11, 1969

Inventor(s) Latham E. Whitham

It is certified that error appears in the above-identified patent and that said Letters Patent are hereby corrected as shown below:

Column 26, line 62, cancel "having a plurality of positions correspond-" and substitute -- is synchronized with the position of said--.

SIGNED AND
SEALED
FEB 24 1970

(SEAL)
Attest:

Edward M. Fletcher, Jr.
Attesting Officer

WILLIAM E. SCHUYLER, JR.
Commissioner of Patents